United States Patent
Hiraoka

(10) Patent No.: US 10,829,575 B2
(45) Date of Patent: Nov. 10, 2020

(54) PHOTOPOLYMERIZABLE COMPOSITION, PHOTOPOLYMERIZABLE INK, COMPOSITION CONTAINER, IMAGE OR CURED PRODUCT FORMING METHOD, IMAGE OR CURED PRODUCT FORMING DEVICE, AND IMAGE OR CURED PRODUCT

(71) Applicant: Takao Hiraoka, Kanagawa (JP)

(72) Inventor: Takao Hiraoka, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/311,231

(22) PCT Filed: Jun. 1, 2015

(86) PCT No.: PCT/JP2015/002764
§ 371 (c)(1),
(2) Date: Nov. 15, 2016

(87) PCT Pub. No.: WO2015/186340
PCT Pub. Date: Dec. 10, 2015

(65) Prior Publication Data
US 2017/0073445 A1    Mar. 16, 2017

(30) Foreign Application Priority Data

Jun. 6, 2014 (JP) ................. 2014-117770

(51) Int. Cl.
*C08F 220/18* (2006.01)
*C09D 11/101* (2014.01)
(Continued)

(52) U.S. Cl.
CPC .............. *C08F 220/18* (2013.01); *C08F 2/48* (2013.01); *C08F 257/02* (2013.01);
(Continued)

(58) Field of Classification Search
CPC ........ C08F 220/18; C08F 257/02; C08F 2/48; C08F 2220/1825; C08F 2220/1833; C09D 4/00; C09D 11/101; C09D 11/30
See application file for complete search history.

(56) References Cited

U.S. PATENT DOCUMENTS 5,834,559 A * 11/1998 Deguchi ................. C08L 23/10
525/93
8,926,082 B2    1/2015 Hiraoka
(Continued)

FOREIGN PATENT DOCUMENTS

JP    60-063211    4/1985
JP    01-197348    8/1989
(Continued)

OTHER PUBLICATIONS

Takeshi et al., machine English translation of JP 09-118705 (May 6, 1997).*
(Continued)

*Primary Examiner* — Jessica M Roswell
(74) *Attorney, Agent, or Firm* — Oblon, McClelland, Maier & Neustadt, L.L.P.

(57) ABSTRACT

A photopolymerizable composition, which contains: a monofunctional monomer having a viscosity of 5 mPa·s or less at 25° C.; one or more polyfunctional monomers including glycerol dimethacrylate; and a polymer free from a hydrophilic functional group, wherein a mass ratio (A/B) of an amount (A) of the polymer free from a hydrophilic functional group to an amount (B) of the polyfunctional monomer is greater than 0.80 but 3 or less.

17 Claims, 1 Drawing Sheet

(51) Int. Cl.
    *C09D 11/30*     (2014.01)
    *C08F 2/48*     (2006.01)
    *C08F 265/06*     (2006.01)
    *C08F 257/02*     (2006.01)
    *C09D 4/00*     (2006.01)

(52) U.S. Cl.
    CPC .............. *C08F 265/06* (2013.01); *C09D 4/00* (2013.01); *C09D 11/101* (2013.01); *C09D 11/30* (2013.01); *C08F 220/1804* (2020.02)

(56) References Cited

U.S. PATENT DOCUMENTS

| | | | |
|---|---|---|---|
| 8,926,083 B2 | 1/2015 | Hiraoka | |
| 8,926,084 B2 | 1/2015 | Hiraoka | |
| 2004/0145639 A1 | 7/2004 | Noutary | |
| 2009/0136696 A1 | 5/2009 | Faltermeier et al. | |
| 2010/0247940 A1* | 9/2010 | Takahashi | C08F 2/48 428/522 |
| 2011/0105638 A1* | 5/2011 | Kawabe | C08F 212/00 522/182 |
| 2012/0146264 A1 | 6/2012 | Kawashima | |
| 2013/0321539 A1* | 12/2013 | Hiraoka | C09D 11/30 347/86 |
| 2014/0125744 A1 | 5/2014 | Hiraoka | |
| 2014/0240414 A1 | 8/2014 | Hiraoka | |
| 2014/0311380 A1 | 10/2014 | Hiraoka | |
| 2014/0320572 A1 | 10/2014 | Hiraoka | |
| 2014/0327719 A1 | 11/2014 | Hiraoka | |
| 2014/0336298 A1 | 11/2014 | Hiraoka | |
| 2014/0338562 A1 | 11/2014 | Hiraoka | |
| 2015/0009265 A1 | 1/2015 | Kohzuki et al. | |
| 2015/0042731 A1 | 2/2015 | Hiraoka | |
| 2015/0091986 A1 | 4/2015 | Seno et al. | |
| 2015/0099819 A1 | 4/2015 | Hiraoka | |

FOREIGN PATENT DOCUMENTS

| | | |
|---|---|---|
| JP | 07-010894 | 2/1995 |
| JP | 09-118705 | 5/1997 |
| JP | 2001-329027 | 11/2001 |
| JP | 2004-526820 | 9/2004 |
| JP | 2012-121300 | 6/2012 |
| JP | 2012-141459 | 7/2012 |
| JP | 2013-249357 | 12/2013 |
| RU | 2 485 153 C2 | 6/2013 |

OTHER PUBLICATIONS

International Search Report dated Aug. 25, 2015 for counterpart International Patent Application No. PCT/JP2015/002764 filed Jun. 1, 2015.

Combined Office Action and Search Report dated Dec. 6, 2017 in Russian Patent Application No. 2016147692/04(076617) (with English language translation), 15 pages.

* cited by examiner

[Fig. 1]
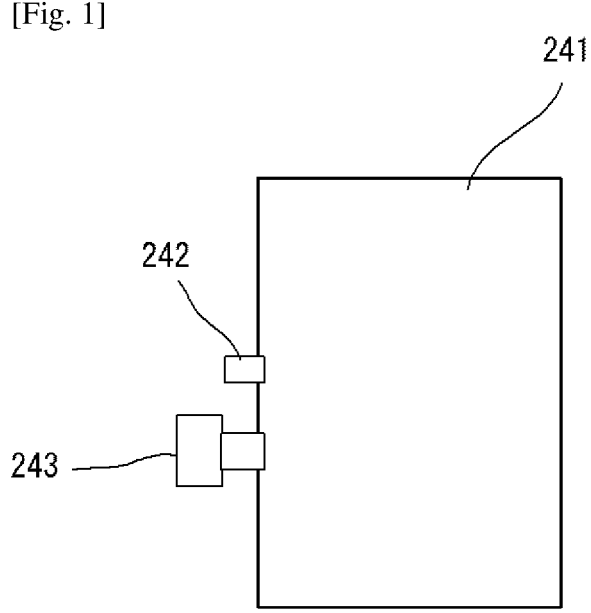
[Fig. 2]
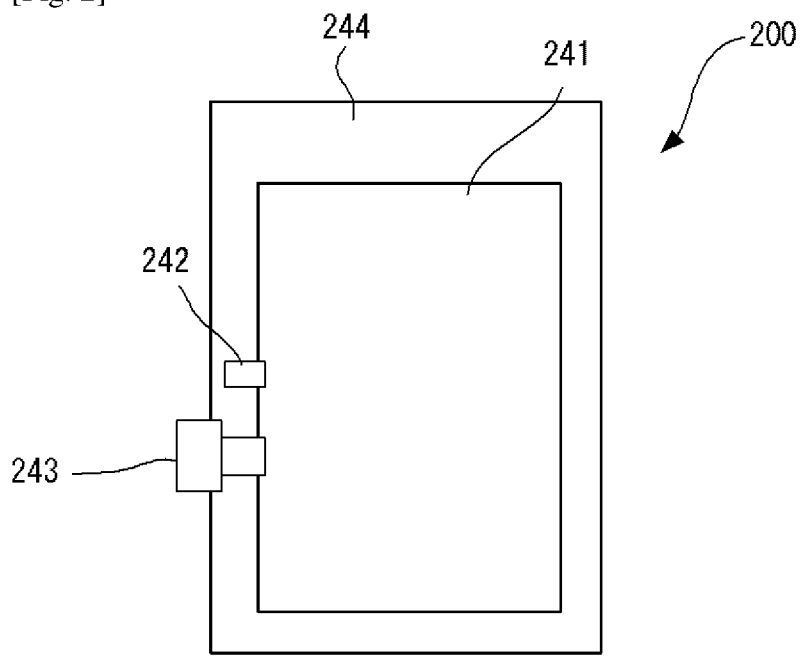
[Fig. 3]
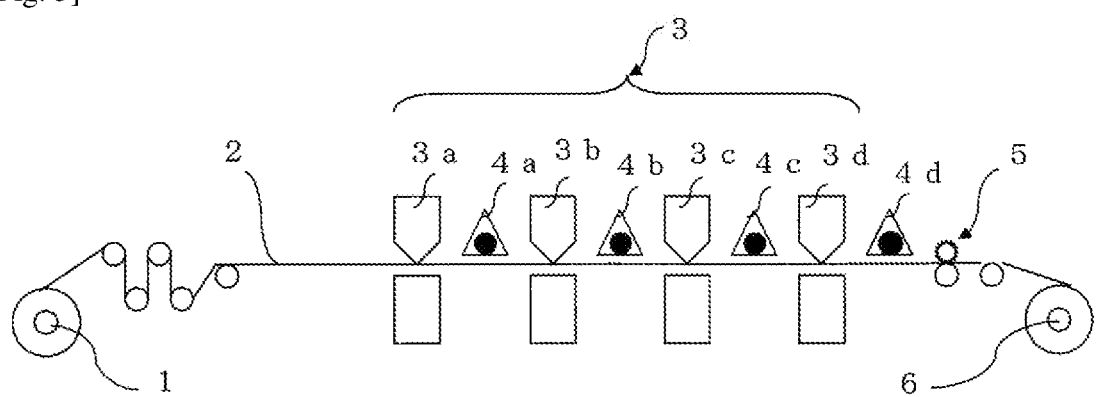

PHOTOPOLYMERIZABLE COMPOSITION, PHOTOPOLYMERIZABLE INK, COMPOSITION CONTAINER, IMAGE OR CURED PRODUCT FORMING METHOD, IMAGE OR CURED PRODUCT FORMING DEVICE, AND IMAGE OR CURED PRODUCT

TECHNICAL FIELD

The present invention relates to a photopolymerizable composition, a photopolymerizable ink, a composition container, an image or cured product forming method, an image or cured product forming device, and an image or a cured product.

BACKGROUND ART

Conventionally, a photopolymerizable inkjet ink composed of a photopolymerizable composition containing a photopolymerizable monomer (e.g., (meth)acrylate) has been widely known (see, for example, PTL 1). Moreover, it has been also known that various properties can be provided to an image or a cured product by blending a polymer component to the photopolymerizable composition (see, for example PTL 2).

One of advantages obtained by blending the polymer component to the photopolymerizable composition is that sufficient adhesion can be secured to a type of a base material (e.g., a plastic material), to which the photopolymerizable composition does not easily penetrate, and which is relatively smooth so that it is difficult to secure adhesion of an image or a cured product. Not only when the photopolymerizable composition to which the polymer component is blended is used in a coating method, such as spray coating, and bar coating, but also when the photopolymerizable composition is used as a photopolymerizable inkjet ink, however, use of the polymer component in the photopolymerizable inkjet ink significantly increases viscosity of the photopolymerizable inkjet ink, and hence there is a problem that it is difficult to attain low viscosity thereof suitable for use in an inkjet system, unless a photopolymerizable monomer, which has sufficiently low viscosity, is used.

Moreover, many of photopolymerizable monomers used in conventional photopolymerizable compositions are toxic. Especially most of sufficiently low viscous monomers among (meth)acrylate that is inexpensive and readily available are highly toxic in terms of skin sensitization that causes allergy reactions, as it is touched by skins. Accordingly, it is still difficult to attain a photopolymerizable composition, which has no problem of skin sensitization, and has sufficiently low viscosity even when a polymer component is blended therein.

Among the aforementioned problems, reduction in the viscosity of the photopolymerizable composition can be easily achieved by blending a diluted solvent. However, it should be avoid to blend a solvent in the photopolymerizable composition, considering a potential effect of a solvent applied to the environment by releasing the evaporated solvent into the air. Moreover, another idea is a method where a water-soluble monomer is used, and viscosity of a resulting photopolymerizable composition is reduced by blending water therein. As a permeation dry effect cannot be expected from a base material, such as a plastic film, glass, and a metal material, water needs to be evaporated to dry when an increase in the speed of a printing process is attempted. To this end, a heating device, such as a heat source, needs to be provided. Therefore, use of such photopolymerizable composition is not preferable in view of energy saving.

In view of the above, the present inventors diligently conducted researches to solve the aforementioned problems. As a result of this, the present inventors has proposed a photopolymerizable inkjet ink, which contains at least one selected from the group consisting of tert-butyl methacrylate, n-pentyl methacrylate, and n-hexylmethacrylate, and glycerol dimethacrylate, and further contains a polymer or copolymer composed of at least one selected from the group consisting of styrene, a styrene derivative, acrylic acid ester, and acrylic acid (see PTL 3). According to this proposal, a photopolymerizable inkjet ink, which has no problem of skin sensitization, has viscosity that is low enough not to cause any problem in inkjet ejection, and exhibits excellent adhesion to a plastic material.

However, adhesion has not been sufficient for the use of an image or a cured product requiring water resistance, after immersing the image or the cured product, specially formed on a non-permeable base, such as a plastic material, in water.

CITATION LIST

Patent Literature

PTL 1: Japanese Patent Application Laid-Open (JP-A) No. 2004-526820
PTL 2: Japanese Patent Application Publication (JP-B) No. 07-10894
PTL 3: Japanese Patent Application Laid-Open (JP-A) No. 2013-249357

SUMMARY OF INVENTION

Technical Problem

The present invention aims to provide a photopolymerizable composition, which has excellent water resistance, such that adhesion of an image or cured product formed of the photopolymerizable composition on a non-permeable base material is desirably maintained even when the image or cured product is immersed in water.

Solution to Problem

As the means for solving the aforementioned problems, the photopolymerizable composition of the present invention contains:
a monofunctional monomer having a viscosity of 5 mPa·s or less at 25° C.;
one or more polyfunctional monomers including glycerol dimethacrylate; and
a polymer free from a hydrophilic functional group,
wherein a mass ratio (A/B) of an amount (A) of the polymer free from a hydrophilic functional group to an amount (B) of the polyfunctional monomers is greater than 0.80 but 3 or less.

Advantageous Effects of Invention

The present invention provide a photopolymerizable composition, which has excellent water resistance, such that adhesion of an image or cured product formed of the photopolymerizable composition on a non-permeable base material is desirably maintained even when the image or cured product is immersed in water.

BRIEF DESCRIPTION OF DRAWINGS

FIG. 1 is a schematic diagram illustrating one example of an ink cartridge as a composition container.

FIG. 2 is a schematic diagram illustrating the ink cartridge of FIG. 1, as the composition container, including a case of the ink cartridge.

FIG. 3 illustrates one example of an image and/or cured product forming device (inkjet recording device).

DESCRIPTION OF EMBODIMENTS

Photopolymerizable Composition

The photopolymerizable composition of the present invention contains at least a monofunctional monomer having a viscosity of 5 mPa·s or less at 25° C. (may be referred to as a low viscous monofunctional monomer, hereinafter), tert-butyl methacrylate, one or more polyfunctional monomers including glycerol dimethacrylate, and a polymer free from a hydrophilic functional group, and may further contain other components, as necessary.

The present inventors have diligently conducted researches to solve the aforementioned problems. As a result, the present inventors have come to the following insight, based on which the present invention has been accomplished. In the case where a photopolymerizable composition is used as a photopolymerizable inkjet ink, a monofunctional monomer having a viscosity of 5 mPa·s or less at 25° C. per se is an essential component for reduce a viscosity of the photopolymerizable composition to the range ejectable by inkjet.

Note that, a viscosity of the low viscous monofunctional monomer per se is preferably 3 mPa·s or less at 25° C., more preferably about 1 mPa·s or less at 25° C. The viscosity can be measured by means of a cone-plate rotor viscometer, VISCOMETER TV-22, manufactured by Toki Sangyo Co., Ltd., using a corn rotor (1° 34'×R24) at the rotational speed of 50 rpm, with setting the temperature of constant-temperature circulating water to 25° C.

The viscosity of the photopolymerizable composition can be maintained sufficiently low by using the low viscous monofunctional monomer, even when a polymer component is blended to the photopolymerizable inkjet ink. However, solo use of the low viscous monofunctional monomer as a photopolymerizable monomer in the photopolymerizable composition cannot give sufficient curability. It is the insight that practical and excellent curability can be attained by containing in the photopolymerizable composition one or more polyfunctional monomers containing glycerol dimethacrylate, which are negative for skin sensitization, inexpensive, and readily available.

<Skin Sensitization>

In the present specification, the photopolymerizable monomer negative for skin sensitization refers to a compound that satisfies at least one of the following (1) to (3).

(1) A compound having a Stimulation Index (SI value) of less than 3, where the Stimulation Index indicates the level of sensitization as measured by a skin sensitization test based on the LLNA (Local Lymph Node Assay).

(2) A compound evaluated as negligible skin sensitization in the literature "Contact Dermatitis 1982(8) 223-225."

(3) A compound evaluated as "no skin sensitization" or "negative for skin sensitization" in MSDS (chemical material safety data sheet).

Regarding the above (1), the compound having a SI value of less than 3 is considered as being negative for skin sensitization as described in literatures, for example, "Functional Material" (Kino Zairyou) September, 2005, Vol. 25, No. 9, p. 55. The lower Si value means lower skin sensitization. In the present invention, therefore, a photopolymerizable monomer having lower SI value is preferably used. The SI value is preferably less than 3, more preferably 2 or less, and even more preferably 1.6 or less.

<Low Viscous Monofunctional Monomer Having Viscosity of 5 mPa·s or Less Per Se at 25° C.>

The low viscous monofunctional monomer having a viscosity of 5 mPa·s or less at 25° C. per se is not particularly limited, but it is preferably any of tert-butyl methacrylate, n-pentyl methacrylate, and n-hexyl methacrylate, which are photopolymerizable monomers negative for skin sensitization, inexpensive, and readily available. The tert-butyl methacrylate is the monofunctional photopolymerizable monomer represented by the following structural formula.

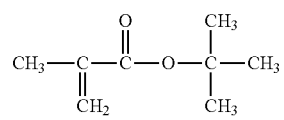

[Chem. 1]

An amount of the low viscous monofunctional monomer is appropriately selected depending on the intended purpose without any limitation, but the amount thereof is preferably 85 parts by mass to 96 parts by mass relative to 100 parts by mass of a total amount of the photopolymerizable monomers. When the amount of the low viscous monofunctional monomer is in the range of 85 parts by mass to 96 parts by mass, the viscosity of the photopolymerizable composition can be sufficiently made low even when a necessary amount of the polymer free from a hydrophilic functional group is blended, and gives a suitable viscosity range for a photopolymerizable ink.

<Polyfunctional Photopolymerizable Monomers>

The polyfunctional photopolymerizable monomers contains at least the glycerol dimethacrylate, which is negative for skin sensitization, is inexpensive, and is readily available. Use of glycerol dimethacrylate can impart the photopolymerizable composition with excellent curability.

As for the polyfunctional photopolymerizable monomers, it is preferred that, in addition to the glycerol dimethacrylate, tricyclodecane dimethanol dimethacrylate, which is negative for skin sensitization, inexpensive, and readily available, be contained in view of an improvement of curability.

An amount of the polyfunctional photopolymerizable monomers is appropriately selected depending on the intended purpose without any limitation, but the amount thereof is preferably 4 parts by mass to 25 parts by mass, more preferably 5 parts by mass to 15 parts by mass, relative to 100 parts by mass of a total amount of the photopolymerizable monomers. When the amount of the polyfunctional photopolymerizable monomers is in the range of 4 parts by mass to 25 parts by mass, a resulting photopolymerizable composition can form a coating film having a certain strength even in the case that the photopolymerizable composition contains a colorant. In the case where the amount of the glycerol dimethacrylate is 1 part by mass, moreover, the amount of the low viscous monofunctional monomer is preferably 5 parts by mass to 30 parts by mass, more preferably 10 parts by mass to 25 parts by mass.

The photopolymerizable composition of the present invention may contain other photopolymerizable monomers than the low viscous monofunctional monomer and the polyfunctional photopolymerizable monomers.

The aforementioned other photopolymerizable monomers may be monofunctional or polyfunctional monomers. As for the aforementioned other photopolymerizable monomers, compounds that has a problem in skin sensitization at a certain degree for single use, or a compound skin sensitization of which has not been confirmed, can be used in addition to a compound negative for skin sensitization, as long as a resulting photopolymerizable composition does not have a problem of skin sensitization.

The aforementioned other photopolymerizable monomers are appropriately selected depending on the intended purpose without any limitation. Examples thereof include n-pentyl(meth)acrylate, n-hexyl(meth)acrylate, ethylene glycol di(meth)acrylate, hydroxyl pivalic acid neopentyl glycol di(meth)acrylate, gamma-butyrolactone acrylate, isobornyl (meth)acrylate, formalized trimethylol propane mono(meth)acrylate, polytetramethylene glycol di(meth) acrylate, trimethylol propane (meth)acrylic acid benzoate, triethylene glycol diacrylate, tetraethylene glycol diacrylate, polyethylene glycol diacrylate [$CH_2=CH-CO-(OC_2H_4)_n-OCOCH=CH_2$ (n is nearly equal to 9), $CH_2=CH-CO-(OC_2H_4)_n-OCOCH=CH_2$ (n is nearly equal to 14), $CH_2=CH-CO-(OC_2H_4)_n-OCOCH=CH_2$ (n is nearly equal to 23)], dipropylene glycol di(meth) acrylate, tripropylene glycol di(meth)acrylate, polypropylene glycol dimethacrylate [$CH_2=C(CH_3)-CO-(OC_3H_6)_n-OCOC(CH_3)=CH_2$ (n is nearly equal to 7)], 1,3-butanediol diacrylate, 1,4-butanediol di(meth)acrylate, 1,6-hexanediol di(meth)acrylate, 1,9-nonanediol di(meth) acrylate, neopentyl glycol di(meth)acrylate, tricyclodecane dimethanol diacrylate, propylene oxide-modified bisphenol A di(meth)acrylate, polyethylene glycol di(meth)acrylate, dipentaerythritol hexa(meth)acrylate, (meth)acryloyl morpholine, 2-hydroxypropyl(meth)acrylamide, propylene oxide-modified tetramethylol methane tetra (meth)acrylate, dipentaerythritol hydroxypenta(meth)acrylate, caprolactone-modified dipentaerythritol hydroxypenta(meth)acrylate, ditrimethylol propane tetra(meth)acrylate, pentaerythritol tetra(meth)acrylate, trimethylol propane triacrylate, ethylene oxide-modified trimethylol propane triacrylate, propylene oxide-modified trimethylol propane tri(meth) acrylate, caprolactone-modified trimethylol propane tri (meth)acrylate, pentaerythritol tri(meth)acrylate, tris(2-hydroxyethyl)isocyanurate tri(meth)acrylate, ethoxylated neopentyl glycol di(meth)acrylate, propylene oxide-modified neopentyl glycol di(meth)acrylate, propylene oxide-modified glyceryl tri(meth)acrylate, poly ester di(meth)acrylate, polyester tri(meth)acrylate, polyester tetra(meth) acrylate, polyester penta(meth)acrylate, polyester poly (meth)acrylate, N-vinyl caprolactam, N-vinyl pyrrolidone, N-vinyl formamide, polyurethane di(meth)acrylate, polyurethane tri(meth)acrylate, polyurethane tetra(meth)acrylate, polyurethane penta(meth)acrylate, polyurethane poly (meth)acrylate, triethylene glycol divinyl ether, cyclohexane dimethanol divinyl ether, cyclohexane dimethanol monovinyl ether, diethylene glycol divinyl ether, dicyclopentadiene vinyl ether, tricyclodecane vinyl ether, benzyl vinyl ether, ethyl oxetane methylvinyl ether, triethylene glycol divinyl ether, and ethyl vinyl ether. These may be used alone, or in combination.

<Polymer Free from Hydrophilic Functional Group>

A term "a hydrophilic functional group" in the polymer free from a hydrophilic functional group typically means, for example, a substituent having polarity, such as a hydroxyl group, a carboxyl group, a phosphonic acid group, a sulfonic acid group, and an amino group.

In the present specification, the phrase "free from a hydrophilic functional group" associated with the polymer free from a hydrophilic functional group means that an acid value, a saponification value, or a hydroxyl value of the polymer as measured by JIS K0070 "Test methods for acid value, saponification value, ester value, iodine value, hydroxyl value, and unsaponifiable matter of chemical products" or a method according to the standard thereof is 1 mg/g or less. Among them, it is preferred that the acid value of the polymer free from a hydrophilic functional group be 1 mgKOH/g or less.

The polymer free from a hydrophilic functional group is preferably a polymer having excellent solubility to the photopolymerizable monomer constituting the photopolymerizable composition, more preferably a polymer having a chain structure rather than a dense cross-link structure, and having the weight average molecular weight of 1,000,000 or less, and even more preferably a polymer having the weight average molecular weight of 4,400 to 450,000.

The polymer free from a hydrophilic functional group, which has a chain structure and the weight average molecular weight of 1,000,000 or less, is preferable, as such the polymer can be easily dissolved to the photopolymerizable monomer.

Moreover, the polymer is preferably a low crystalline material having flexibility in order to improve solubility. In addition, practically, a polymer that is inexpensive and readily available is more preferable.

The weight average molecular weight can be measured, for example, by the standard polystyrene molecular weight conversion using high speed liquid chromatography ("Waters 2695 (main body)" and "Waters 2414 (detector), manufactured by Nihon Waters K.K.), with which three-series columns Shodex GPC KF-806L (cut-off molecular weight: $2 \times 10^7$, separation range: 100 to $2 \times 10^7$, theoretical plate number: 10,000 plates per column, filler material: styrene-divinylbenzene copolymer, filler particle diameter: 10 μm) are used, and tetrahydrofuran is used as an eluent.

Examples of the polymer free from a hydrophilic functional group include a polymer or copolymer composed of at least one monomer selected from the groups consisting of a vinyl monomer, such as styrene, and a styrene derivative, and a (meth)acrylate monomer. Among them, particularly preferred are polystyrene, ethyl polymethacrylate, and a styrene-butyl methacrylate copolymer.

By blending the polymer free from a hydrophilic functional group in the photopolymerizable composition, excellent water resistance, such that an image or cured product thereof formed on a non-permeable base material, such as plastic, glass, and a metal material, desirably maintain adhesion even when it is immersed in water.

The polymer free from a hydrophilic functional group has a significantly higher molecular weight than those of the aforementioned photopolymerizable monomers, and thus it is difficult for such the polymer to pass through skins, and the polymer typically gives no skin sensitization.

In the present invention, a mass ratio (A/B) of an amount (A) of the polymer free from a hydrophilic functional group to an amount (B) of the polyfunctional monomer(s) is greater than 0.80 but 3 or less, preferably 1.3 to 3.

The photopolymerizable composition having the mass ratio (A/B) of greater than 0.80 but 3 or less is advantageous, because excellent water resistance, such that the adhesion of an image or cured product thereof formed on a non-permeable base material can be desirably maintained, is attained. When the mass ratio (A/B) is 3 or less, the resulting photopolymerizable composition can be suitably used for inkjet.

<Photopolymerizable Initiator>

The photopolymerizable initiator is appropriately selected depending on the intended purpose without any limitation, but it is preferably a photo radical polymerization initiator.

As for the photo radical polymerization initiator, a photoradical polymerization initiator negative for skin sensitization is preferable.

(Meth)acrylate, (meth)acryl amide, derivatives thereof, and a vinyl ether compound are known to have ionic polymerization properties. Not only that these ionic polymerization initiators are typically expensive, these initiators generate a slight amount of strong acid or strong alkali even in the state where they are not irradiated with light. Therefore, it is necessary to take special cares, such as imparting acid resistance or alkali resistance to a coating member of a photopolymerizable composition, or a section in an inkjet system in contact with a liquid, imposing a limitation on a choice of the coating member for use, or members constituting the inkjet system.

In contrast, the photopolymerizable composition of the present invention can use a photoradical polymerization initiator that is inexpensive and generates no strong acid or strong alkali. Therefore, it is possible to produce a photopolymerizable composition at low cost, and it is also easy to select the coating member or the members constituting the inkjet system.

Note that, when a high energy light source, such as electron beams, alpha rays, beta rays, gamma rage, and X-rays, is used, a polymerization reaction proceeds without a polymerization initiator, although there is a disadvantage that a large cost is required for installation or maintenance of equipment. This is a conventionally known matter, and not described in detail in the present specification.

Examples of the photoradical photopolymerizable initiator include a self-cleaving photopolymerizable initiator, and a hydrogen-abstracting photopolymerizable initiator.

Examples of the self-cleaving photopolymerizable initiator include 2,2-dimethoxy-1,2-diphenylethan-1-one, 1-hydroxycyclohexylphenylketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methylpropionyl)benzyl]phenyl}-2-methyl-1-propan-1-one, oligo[2-hydroxy-2-methyl-1-[4-(1-methylvinyl)phenyl]propanone, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1,2-dimethylamino-2-(4-methylbenzyl)-1-(4-morpholin-4-yl-phenyl)butan-1-one, bis(2,4,6-trimethylbenzoyl)phenylphosphine oxide, bis(2,6-dimethoxybenzoyl)-2,4,4-trimethyl-pentylphosphine oxide, 2,4,6-trimethylbenzoylposphine oxide, 1,2-octanedion-[4-(phenylthio)-2-(o-benzoyloxime)], ethanone-1-[9-ethyl-6-(2-methylbenzoyl)-9H-carbazol-3-yl]-1-(0-acetyloxime), [4-(methylphenylthio)phenyl]phenylmethanone, and oligo [2-hydroxy-2-methyl-1-[4-(1-methylvinyl)phenyl]propanone. These may be used alone, or in combination.

Examples of the hydrogen-abstracting photopolymerizable initiator include: a benzophenone-based compound, such as benzophenone, methyl benzophenone, methyl-2-benzoylbenzoate, 4-benzoyl-4'-methyldiphenyl sulfide, and phenyl benzophenone; and a thioxanthone-based compound, such as 2,4-diethylthioxanthone, 2-chlorothioxanthone, isopropylthioxanthone, and 1-chloro-4-propylthioxanthone. These may be used alone, or in combination.

An amount of the photopolymerizable initiator is appropriately selected depending on the intended purpose without any limitation, but the amount thereof is preferably 2 parts by mass to 10 parts by mass relative to 100 parts by mass of a total amount of the photopolymerizable monomers for use. When the amount of the photopolymerizable initiator is in the range of 2 parts by mass to 10 parts by mass, the strength of a coating film of the resulting photopolymerizable composition can be maintained at a certain strength or higher.

<<Polymerization Accelerator>>

An amine compound may be used as a polymerization accelerator in combination with the photopolymerizable initiator in the photopolymerizable composition of the present invention.

Examples of the amine compound include ethyl-p-dimethylaminobenzoate, 2-ethylhexyl-p-dimethylaminobenzoate, methyl-p-dimethylaminobenzoate, 2-dimethylaminoethyl benzoate, and butoxyethyl-p-dimethylaminobenzoate. These may be used alone, or in combination.

The photopolymerizable composition of the present invention may contain no colorant to form a clear liquid, or may contain a colorant to form a color liquid. Note that, in the case the clear liquid is formed, or it is desired to maintain a color tone of a colorant itself as much as possible, it is preferred that materials for use, other than the following colorant, have as little color as possible.

<Colorant>

As for the colorant, an inorganic pigment, or an organic pigment can be used. Note that, various inorganic pigments or organic pigments can be used depending on the requirements considering physical properties of a resulting ink.

Examples of the black pigment include carbon black produced by a furnace method or a channel method.

Examples of the yellow pigment include pigments of Pigment Yellow series, such as Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Examples of the magenta pigment include pigments of Pigment Red series, Pigment Red 5, Pigment Red 7, Pigment Red 12, Pigment Red 48(Ca), Pigment Red 48(Mn), Pigment Red 57(Ca), Pigment Red 57:1, Pigment Red 112, Pigment Red 122, Pigment Red 123, Pigment Red 168, Pigment Red 184, Pigment Red 202, and Pigment Violet 19.

Examples of the cyan pigment include pigments of Pigment Blue series, such as Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Vat Blue 4, and Vat Blue 60.

Examples of the white pigment include: sulfuric acid salts of alkaline earth metals such as barium sulfate; carbonic acid salts of alkaline earth metals such as calcium carbonate; silica such as fine silicic acid powder and synthetic silicic acid salts; calcium silicate; alumina; alumina hydrate; titanium oxide; zinc oxide; talc; and clay.

<Other Components>

Examples of the aforementioned other components include: a polymerization inhibitor; higher fatty acid ester containing a polyether, an amino group, a carboxyl group, or a hydroxyl group; a polydimethylsiloxane compound containing a polyether residue, an amino group, a carboxyl group, or a hydroxyl group at a side chain or terminal thereof; a surfactant, such as a fluoroalkyl compound containing a polyether residue, an amino group, a carboxyl group, or a hydroxyl group; and a polar group-containing polymer pigment dispersing agent. In the case where a material containing a hydrophilic functional group is used among the aforementioned components, use of the material in an amount of 5% by mass or less can secure water resistance of a resulting photopolymerizable composition.

<<Polymerization Inhibitor>>

Examples of the polymerization inhibitor include 4-methoxy-1-naphthol, methylhydroquinone, hydroquinone, tert-butylhydroquinone, di-tert-butylhydroquinone, methoquinone, 2,2'-dihydroxy-3,3'-di(alpha-methylcyclohexyl)-5,5'-dimethyl diphenylmethane, p-benzoquinone, di-tert-butyldiphenylamine, 9,10-di-n-butoxycyanthracene, and 4,4'-[1,10-dioxo-1,10-decane diylbis(oxy)bis][2,2,6,6-tetramethyl]-1-piperidinyloxy. These may be used alone, or in combination.

The photopolymerizable composition of the present invention may contain an organic solvent, but the photopolymerizable composition is preferably free from an organic solvent, if possible. When the composition is free from an organic solvent, especially in case of a composition free from a volatile organic solvent (volatile organic compounds (VOC) free composition), safety of a place where the composition is handled is enhanced, and environmental pollutions can be prevented.

The term "organic solvent" means a typical non-reactive organic solvent, such as ether, ketone, xylene, ethyl acetate, cyclohexanone, and toluene, and should be distinguished from a reactive monomer. Moreover, "free from" the organic solvent means that the composition substantially does not contain the organic solvent, and the organic solvent content is preferably 0.1% by mass or less.

<Use>

Use of the photopolymerizable composition of the present invention is appropriately selected depending on the intended purpose without any limitation, provided that it is used in a field where a photopolymerizable composition is typically used. For example, the photopolymerizable composition can be applied for a resin for molding, a coating agent, an adhesive, an insulating material, a releasing agent, a coating material, a sealing material, various resist materials, and various optical materials.

Moreover, the photopolymerizable composition of the present invention can be also used as a solid forming material for forming a three-dimensional solid object, as well as an ink for forming a two-dimensional characters, images, or design coating films to various types of a base.

(Photopolymerizable Ink)

The photopolymerizable ink of the present invention contains the photopolymerizable composition of the present invention.

The photopolymerizable ink is preferably for use in inkjet printing.

The viscosity of the photopolymerizable ink at 25° C. is preferably 2 mPa·s to 150 mPa·s, more preferably 3 mPa·s to 18 mPa·s.

As for the inkjet ejection head, there is a head having a large ejection power compatible to a high viscous ink, and a head having a function of controlling temperature in a wide range. In the case where the temperature control function of the inkjet ejection head can be used, the inkjet ejection heat is headed to reduce the viscosity of the ink, as necessary, if the viscosity of the ink is too high at 25° C. Assuming the heating condition is 60° C., the viscosity of the photopolymerizable composition at 60° C. is preferably 2 mPa·s to 20 mPa·s, more preferably 3 mPa·s to 18 mPa·s.

The viscosity is measured by means of a cone-plate rotor viscometer, VISCOMETER TV-22, manufactured by Toki Sangyo Co., Ltd., using a corn rotor (1°34'×R24) at the rotational speed of 50 rpm, with setting the temperature of constant-temperature circulating water to 25° C. or 60° C. As for the adjustment of the temperature of the circulating water, VISCOMATE VM-150III is used. The temperature of 25° C. is specified based on a typical room temperature environment, and the temperature of 60° C. is specified based on a specification of a commercially available heatable inkjet ejection head, such as GEN4, manufactured by Ricoh Industry Company, Ltd.

The static surface tension of the photopolymerizable ink at 25° C. is preferably 20 mN/m to 40 mN/m, more preferably 28 mN/m to 35 mN/m.

The static surface tension is measured at 25° C. by means of a static surface tensiometer (CBVP-Z, manufactured by Kyowa Interface Science Co., Ltd.). The static surface tension is specified based on a specification of a commercially available inkjet ejection head, such as GEN4, manufactured by Ricoh Industry Company, Ltd.

(Composition Container)

The composition container of the present invention contains a container, and the composition of the present invention housed in the container.

The composition container of the present invention contains the photopolymerizable ink of the present invention, and a container, and may further contain other members, such as a composition bag, as necessary. With this form, users do not have to directly touch the composition during operations such as exchange of a composition, and therefore it is not necessary to worry about staining their fingers, hands, or clothes. In addition, it is possible to prevent interfusion of foreign matter, such as dusts, into the composition.

The container is not particularly limited, and a shape, structure, size, and material thereof are appropriately selected depending on the intended purpose. For example, preferred is a container containing a composition bag formed of an aluminum laminate film, or a resin film.

The ink cartridge as one example of the composition container is explained with reference to FIGS. 1 and 2. FIG. 1 is a schematic diagram illustrating one example of an ink bag 241 of an ink cartridge, and FIG. 2 is a schematic diagram illustrating an ink cartridge 200, in which the ink bag 241 of FIG. 1 is housed in a cartridge case 244.

As illustrated in FIG. 1, the ink bag 241 is filled with the ink by injecting the ink from an ink inlet 242. After removing the air present inside the ink bag 241, the ink inlet 242 is sealed by fusion bonding. At the time of use, a needle attached to the main body of the device is inserted into an ink outlet 243 formed of a rubber member to supply the ink to the device. The ink bag 241 is formed of a wrapping member, such as an air non-permeable aluminum laminate film. As illustrated in FIG. 2, the ink bag 241 is typically housed in a plastic cartridge case 244, and the resultant is used as the ink cartridge 200, which is detachably mounted in use to various image or cured product forming devices (inkjet recording devices).

The ink cartridge is preferably detachably mounted in an image or cured product forming device (inkjet recording device). As a result of this, refill or replacement of the ink can be simplified, and workability can be improved.

(Method for Forming Image or Cured Product and Image or Cured Product Forming Device)

The method for forming an image or a cured product of the present invention contains at least an applying step, and a curing step, and may further contain other steps, as necessary.

The image or cured product forming device of the present invention contains at least an application unit, and a curing unit, and may further contain other units, as necessary.

The method for forming an image or a cured product of the present invention can be suitably carried out by the image or cured product forming device of the present invention, the applying step can be carried out by the application unit, the curing step can be carried out by the curing unit, and the aforementioned other steps can be carried out by the aforementioned other units.

<Applying Step and Application Unit>

The applying step is a step containing applying the photopolymerizable composition of the present invention, or the photopolymerizable ink of the present invention onto a base material, and the applying step is carried out by the application unit.

The application method is appropriately selected depending on the intended purpose without any limitation, but the application method is preferably of an inkjet ejection system, or of a coating system. Among them, the inkjet ejection system is particularly preferable.

The inkjet ejection system is appropriately selected depending on the intended purpose without any limitation. As for a driving system of the ejection head, a piezoelectric element actuator using PZT or the like, an on-demand head using an actuator utilizing a system where a thermal energy is functioned, or an actuator using electrostatic force, or a continuous jet head of a charge control type may be used.

The coating method is appropriately selected depending on the intended purpose without any limitation, and examples thereof include blade coating, gravure coating, gravure offset coating, wire bar coating, bar coating, roller coating, knife coating, air knife coating, comma coating, U-comma coating, AKKU coating, smoothing coating, microgravure coating, reverse roller coating, 4- or 5-roll coating, dip coating, curtain coating, slide coating, and die coating. Among them, preferred are wire bar coating, and roller coating.

<Base Material>

As for the base material, an absorbent base material, such as wood free paper, can expect a permeation drying effect, and thus it is practical to use an aqueous ink or an oil-based ink, which is not quick drying, on such the base material. In case of a non-permeable base material, such as coated paper, synthetic paper, a plastic film, a plastic molded product, ceramic, glass, and metal, on the other hand, it is practical to use a quick-drying ink thereon, and it is preferably to the photopolymerizable ink of the present invention, which is immediately cured upon light irradiation.

The photopolymerizable composition of the present invention, or the photopolymerizable ink of the present invention is particularly suitably used with the non-permeable base material.

As for a plastic material, such as a film, and a molded product, among the non-permeable base materials, for example, preferred is polyethylene, polypropylene, polyethylene terephthalate, polycarbonate, an ABS resin, polyvinyl chloride, polystyrene, polyester, polyamide, a vinyl-based material, or a composite material of the foregoing materials.

There is a case where a corona treatment is performed on the plastic material in order to activate a surface thereof to improve the adhesion. Even when the corona treatment is performed, however, there are not many polar functional groups present on the surface thereof, and the surface thereof is inactive. Therefore, it is typically difficult to form an image or coating film thereon, and exhibit excellent adhesion. However, an image or coating film can be formed on the plastic material and excellent adhesion thereof can be attained by using the photopolymerizable composition of the present invention, or the photopolymerizable ink of the present invention.

Moreover, an inorganic base material, such as metal, ceramic, and glass, is highly active, as long as a surface thereof is clean, and adhesion of a coating film is relatively excellent. However, such a clean surface is polluted through adsorption of impurities, only be leaving it in the atmosphere. Therefore, it is typically difficult for the inorganic base material to attain excellent adhesion, similarly to the plastic material.

Among these various materials, polypropylene and polyethylene terephthalate are typical base materials that are especially hard to attain adhesion. As these materials are widely used for general purpose, it is strongly desired to evaluate the adhesion to these materials. If the adhesion to these materials can be attained, the adhesion to the aforementioned other materials can be also attained.

The average thickness of an image before the curing or a cured product is preferably 5 µm to 20 µm. The average thickness of 5 µm to 20 µm is advantageous, as a resulting image or cured product, which is formed on a non-permeable base material, has excellent water resistance, such that the adhesion can be desirably maintained after being immersed in water.

<Curing Step and Curing Unit>

The curing step is a step containing irradiating a film applied on the base material with active energy rays to cure the film, and is performed by the curing unit.

Examples of the curing unit include a UV radiation device.

The curing is preferably performed by irradiating with ultraviolet (UV) rays as the active energy rays. The UV rays as the active energy rays are appropriately selected depending on the intended purpose without any limitation, but it is preferably light having a wavelength of 350 nm to 450 nm.

As for the irradiation with active energy rays, it is preferred that a sufficient dose of active energy rays be applied to cure the film with considering potential thermal damages applied to the base material.

The radiation dose of the active energy rays is appropriately selected depending on the intended purpose without any limitation, but it is preferably 1,000 mJ/cm$^2$ to 2,000 mJ/cm$^2$. When the radiation dose is within the aforementioned preferable range, a curing reaction is sufficiently carried out.

A light source of the ultraviolet ray radiation is appropriately selected depending on the intended purpose without any limitation, and examples thereof include a lamp (e.g., a metal halide lamp, a xenon lamp, a carbon arc lamp, a chemical lamp, a low-pressure mercury lamp, and a high-pressure mercury lamp), and a ultraviolet ray emitting semiconductor element (e.g., a UV light emitting diode (UV LED), and a UV light emitting semiconductor laser). For example, the UV ray radiation can be performed using a commercially available product, such as H Lamp, D Lamp, and V Lamp, manufactured by Noblelight Fusion.

<Other Steps and Other Units>

Examples of the aforementioned other steps and the aforementioned other units include a transporting step and a transporting unit, and a controlling step and a controlling unit.

FIG. 3 is a schematic diagram illustrating one example of the image or cured product forming device (inkjet recording device) of the present invention used in the method for forming an image or cured product of the present invention.

FIG. 3 illustrates an embodiment where a color print is formed by printing a printing base material 2 (transported from left to right in FIG. 3) with each color (yellow, magenta, cyan, or black) ejected from a printing unit 3 (composed of printing units 3a, 3b, 3c, and 3d of colors (e.g., yellow, magenta, cyan, and black)), and irradiating with light (UV light) each time printed with each color, by means of UV light sources (light sources for curing) 4a, 4b, 4c, and 4d to cure the ink. The printing units 3a, 3b, 3c, 3d are each equipped with a heating system at an ink ejecting section, in order to reduce viscosity of the ink when the viscosity of the ink is excessively high, and equipped with a cooling system at a base material holding section (a section that is upper or lower side of the base material in FIG. 3) in order to optionally cool the base material in a direct or indirect manner. In the case where a printing area of the color, which is printed first, is small and the transporting speed of the base material is slow, the base material is maintained around room temperature by natural cooling for the color printed later. In the case where a printing area of the color, which is printed first, is large, or the transporting speed of the base material is fast, however, the temperature of the base material is increased. Therefore, it is preferred that a cooling system be optionally provided to maintain the temperature of the base material to about room temperature.

As for the printing base material 2, paper, plastic, metal, ceramic, glass, or a composition material thereof is used. Although the printing base material 2 in the form of a roll is illustrated in FIG. 3, the printing base material 2 may be in the form of a sheet. Moreover, printing may be not only one-sided printing, but also double-sided printing.

In high speed printing, high curability can be attained by applying ultraviolet rays every time each color is printed. Energy saving and cost reduction can be realized, for example, by lowering output of UV ray sources 4a, 4b, 4c or omitting the UV ray sources to apply a sufficient dose of UV rays with 4d at once after printing a plurality of colors. Alternatively, for realizing energy saving and cost reduction, LED light sources, which have recently been used practically for printing of photopolymerizable inks, may be used instead of conventionally used light sources such as high-pressure mercury lamps and metal halide lamps.

In FIG. 3, reference numeral 5 denotes a processing unit and reference numeral 6 denotes a wind-up roll for printed products.

(Image or Cured Product)

The image or cured product of the present invention is obtained by the method containing applying the photopolymerizable composition of the present invention, or the photopolymerizable ink of the present invention onto a base material, and curing the photopolymerizable composition, the photopolymerizable ink, or the photopolymerizable inkjet ink.

As for the base material, used is at least one selected from the group consisting of paper, plastic, metal, glass, and a composite material of the foregoing materials.

Examples of the image include letters, symbols, shapes, any combination thereof, and a solid image.

As the photopolymerizable composition of the present invention, or the photopolymerizable ink of the present invention is used for the image or cured product, the image or cured product has excellent water resistance, such that the image or cured product formed on a non-permeable base material desirably maintains adhesion even after immersed in water.

EXAMPLES

Examples of the present invention are explained hereinafter, but the present invention is not limited to these examples in any way.

<Evaluation Method of SI Value>

According to the skin sensitization test of local lymph node assay (LLNA), the SI value was measured in the following manner.

—Test Material—

<<Positive Control>>

As for a positive control, alpha-hexylcinnamaldehyde (HCA, manufactured by Wako Pure Chemical Industries, Ltd.) was used.

<<Vehicle>>

As for a vehicle, a mixed liquid prepared by mixing acetone (manufactured by Wako Pure Chemical Industries, Ltd.) and olive oil (manufactured by Fudimi Pharmaceutical Co., Ltd.) at a volume ratio (acetone:olive oil) of 4:1 was used.

<<Animals Used>>

Before treated with the test substances, the positive control, or the vehicle control, female mice were acclimated for 8 days including 6-day quarantine. No abnormalities were found with all the animals during the quarantine/acclimation period.

Based on the body weights measured 2 days before the initiation of sensitization, they were categorized into 2 groups (4 mice/group) by the body weight stratified random sampling method so that the body weight of each individual was within plus or minus 20%. Each animal was 8 weeks old to 9 weeks old at the time of the initiation of sensitization. The animals remaining after the categorization were excluded from the test. The animals were individually identified by application of oil ink to their tale throughout the test period, and also their cages were labeled for identification.

<<Housing Environment>>

Throughout the housing period including the quarantine/acclimation period, the used animals were housed in an animal room with a barrier system, which was set as follows: 21° C. to 25° C. in temperature, 40% to 70% in relative humidity, 10 times/hour to 15 times/hour in a frequency of air circulation, and a 12 hour-interval lighting cycle (lighting from 7:00 to 19:00).

As for the housing cages, cases made of polycarbonate were used. Four animals were housed in each cage.

The used animals were given ad libitum solid feed for laboratory animals MF (product of Oriental Yeast Co., Ltd.). Also, using a water-supply bottle, the used animals were given ad libitum tap water in which sodium hypochlorite (PURELOX, product of OYALOX Co., Ltd.) had been added so that the chlorine concentration was about 5 ppm. Bedding used was SUNFLAKE (fir tree, shavings obtained with a power planer) (product of Charles River Inc.). The feed and all of the feeding equipment were sterilized with an autoclave (121° C., 30 min) before use.

The housing cage and the bedding were replaced with new ones at the times of the categorization and the removal of the auricular lymph node (i.e., the time when the animals were transferred from the animal room), and the water-supply bottle and rack were replaced with new ones at the time of the categorization.

—Test Method—

<<Group Composition>>

The group compositions used in the measurement of the SI value are shown in Table 1.

TABLE 1

| Test group | Sensitization substance | Sensitization dose (μL/auricle) | Times of sensitization | Number of animals (animal No.) |
|---|---|---|---|---|
| Vehicle control group | Vehicle only | 25 | Once/day × 3 days | 4 (1-4) |
| Positive control group | 25.0% HCA | 25 | Once/day × 3 days | 4 (5-8) |

—Preparation—

<<Test Substance>>

Table 2 shows the amount of the test substance. The test substance was weighed in a measuring flask, and the volume of the test substance was adjusted to 1 mL with the vehicle. The thus-prepared test substance preparation was placed in a light-shielded airtight container (made of glass).

TABLE 2

| | Concentration after adjustment (w/v %) | Mass of test substance (g) |
|---|---|---|
| Test substance | 50.0 | 0.5 |

<<Positive Control Substance>>

About 0.25 g of HCA was accurately weighed, and the vehicle was added to the HCA to have the volume of 1 mL, to thereby prepare a 25.0 w/v % solution. The thus-prepared positive control substance preparation was placed in a light-shielded airtight container (made of glass).

<<BrdU>>

In a measuring flask, 200 mg of 5-bromo-2'-deoxyuridine (BrdU, product of NACALAI TESQUE, INC.) was accurately weighed in a measuring flask. Then, physiological saline (product of OTSUKA PHARMACEUTICAL CO., LTD.) was added to the measuring flask, and dissolved through application of ultrasonic waves. Thereafter, the volume of the resultant solution was adjusted to 20 mL to prepare a 10 mg/mL solution (BrdU preparation). The BrdU preparation was sterilized through filtration with a sterilized filtration filter and placed in a sterilized container.

<<Preparation Day and Storage Period>>

The positive control preparation was prepared on the day before the initiation of sensitization, and stored in a cold place except in use. The vehicle and the test substance preparations were prepared on the day of sensitization. The BrdU preparation was prepared 2 days before administration and stored in a cold place until the day of administration.

—Sensitization and Administration of BrdU—

<<Sensitization>>

Each of the test substance preparations, the positive control preparation, and the vehicle was applied to both the auricles of each of the used animals by 25 mL. For the application, a micropipetter was used. This process was performed once a day for three consecutive days.

<<Administration of BrdU>>

About 48 hours after the final sensitization, the BrdU preparation (0.5 mL) was intraperitoneally administered once to each of the used animals.

—Observation and Examination—

<<General Conditions>>

All the used animals used for the test were observed once or more times a day from the day of the initiation of sensitization to the day of the removal of the auricular lymph node (i.e., the day when the animals were transferred from the animal room). Note that, the observation day was counted from the day of the initiation of sensitization being regarded as Day 1.

<<Measurement of Body Weights>>

The body weight of each of the used animals was measured on the day of the initiation of sensitization and on the day of the removal of auricular lymph node (i.e., the day when the animals were transferred from the animal room). Also, the average of the body weights and the standard error thereof were calculated for each group.

<<Removal of Auricular Lymph Node and Measurement of Weight Thereof>>

About 24 hours after the administration of BrdU, the used animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

<<Measurement of BrdU Intake>>

After returning the auricular lymph nodes to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

—Evaluation of Results—

<<Calculation of Stimulation Index (SI)>>

As shown in the following formula, the measurement of BrdU intake for each individual was divided by the average of the measurements of BrdU intake in the vehicle control group to calculate the SI value for the individual. The SI value of each test group was the average of the SI values of the individuals. Also, the standard error of the SI values was calculated for each test group. Notably, the SI value was rounded at the second decimal place and shown up to the first decimal place.

$$SI = \frac{\text{Average of measurements of } BrdU \text{ intake for each individual (average of 3 wells)}}{\text{Average of measurements of } BrdU \text{ intake in the vehicle control group (average of 4 animals)}} \quad [\text{Math. 1}]$$

Examples 1 to 10 and Comparative Examples 1 to 2

Photopolymerizable compositions were each prepared by blending the following materials (A) to (E) in the amounts (the values were based on parts by mass) depicted in each column of respective Examples and Comparative Examples in the following tables 3 to 8.

(A) tert-butyl methacrylate, which is a monofunctional photopolymerizable monomer negative for skin sensitization (B) glycerol dimethacrylate, which is a polyfunctional photopolymerizable monomer negative for skin sensitization (C) tricyclodecane dimethanol dimethacrylate, which is a polyfunctional photopolymerizable monomer negative for skin sensitization (D) photoradical polymerization initiator negative for skin sensitization (E) polymer component In Tables 3 to 8, the details of (A), (B), (C), (D1) to (D2), (E1) to (E5), and carbon black are as described below. The numerical value on the parenthesis at the end is the SI value in the LLNA test in the aforementioned (1), "negative" or "no" means that the compound is evaluated as "light or slight skin sensitization" in the literature "Contact Dermatitis 1982 (8)223-225" in the aforementioned (2), or the compound is evaluated as "negative for skin sensitization" or "no skin sensitization" in the MSDS (Material Safety Data Sheet) in the aforementioned (3).

(A): t-butylmethacrylate, "Acryester TB" manufactured by MITSUBISHI RAYON CO., LTD. (negative), evaluated with the literature (test method: maximization method, viscosity at 25° C.: 0.9 mPa·s). The viscosity was measured by means of a cone-plate rotor viscometer, VISCOMETER TV-22, manufactured by Toki Sangyo Co., Ltd., using a corn rotor (1° 34'×R24) at the rotational speed of 50 rpm, with setting the temperature of constant-temperature circulating water to 25° C.

(B): glycerol dimethacrylate, "701" manufactured by Shin-Nakamura Chemical Co., Ltd. (SI value: 1.2)

(C): tricyclodecane dimethanol dimethacrylate, "DCP" manufactured by Shin-Nakamura Chemical Co., Ltd. (SI value: 1.3)

—Photopolymerizable Initiator—

(D1): 1-hydroxy-cyclohexylphenylketone, "Irgacure184" manufactured by BASF (no), evaluated with MSDS (test method: OECD test guideline 406)

(D2): 2-dimethylamino-2-(4-methylbenzyl)-1-(4-morpholin-4-yl-phenyl)butan-1-one, "Irgacure 379" manufactured by BASF (no), evaluated with MSDS (test method: OECD test guideline 406)

—Polymer Component—

(E1): polystyrene, weight average molecular weight: 4,400, "VS1063" manufactured by SEIKO PMC CORPORATION (acid value: 0 mgKOH/g, no hydrophilic functional group)

(E2): ethyl polymethacrylate, weight average molecular weight: 300,000 to 450,000, "E5001" manufactured by Negami Chemical Industrial Co., Ltd. (acid value: 0 mgKOH/g, no hydrophilic functional group)

(E3): styrene-butyl methacrylate copolymer, weight average molecular weight: 200,000 to 300,000, "M6701" manufactured by Negami Chemical Industrial Co., Ltd. (acid value: 0 mgKOH/g, no hydrophilic functional group)

(E4): styrene-acrylic acid-α-methylstyrene copolymer, weight average molecular weight: 4,600, "JONCRYL 586" manufactured by BASF (acid value: 108 mgKOH/g, presence of hydrophilic functional groups)

(E5): ethyl polymethacrylate, weight average molecular weight: 700,000 to 1,300,000, "E5000" manufactured by Negami Chemical Industrial Co., Ltd. (acid value: 0 mgKOH/g, no hydrophilic functional group)

—Carbon Black—

An amount of carbon black was depicted as an amount thereof in a state where a polymer dispersing agent S32000 manufactured by Lubrizol Japan Co. was blended to carbon black #10 manufactured by Mitsubishi Chemical Corporation at a mass ratio (carbon black:dispersing agent) of 3:1.

<Adhesion Test>

As for the test for the adhesion between a cured coating film of each photopolymerizable composition prepared, and a base material, a commercially available polypropylene film (P2161, manufactured by TOYOBO CO., LTD., thickness: 60 μm) and a commercially available polyethylene terephthalate film (E5100, manufactured by TOYOBO CO., LTD., thickness: 100 μm), which were common film materials widely used as wrapping materials or industrial materials, and were poor adhesive materials, were used as a base material.

The photopolymerizable composition was applied onto a corona-treated surface of each of these films by bar coating or inkjet printing, followed by irradiating the applied composition with UV rays of the UVA region at 3 W/cm$^2$, and at 200 mJ/cm$^2$, by means of a UV radiation device LH6 available from Noblelight Fusion once, or a few times to cure the coating film. The resulting solid coating film was subjected to the evaluation of adhesiveness by a cross-cut method specified in JIS-K-5600-5-6 before and after immersing the coating film in warm water of 40° C. for 24 hours. Note that, in JIS standard, the adhesion to the base material is collectively referred as a term "adhesiveness," but these terms (adhesion and adhesiveness) are technically the same meanings.

In the JIS standard, the test results are classified into 6 stages, i.e., "0," "1," "2," "3," "4," and "5," where "0" is a state in which no peeling is observed when a tape is peeled after adhering the tape to 25 square cuts (5×5) provided on the coating film, and "5" is a state in which significant peelings are observed, and "1" to "4" are intermediate states between "0" and "5." In this test, however, the squares remained without being peeled, out of the 25 squares, were counted, and the adhesion was evaluated based on the following criteria, which was depicted together with the number of the remained squares, for the purpose of performing more precise relative evaluation. In the process of the evaluation, any slight peeling at the intersection part of the cuts, which tended to be strongly influenced by the strength at the time when the knife was inserted, etc. was ignored. Note that, after being immersed in the warm water, the moisture attached to the test coating film was wiped out with a clean cloth, and then the coating film was provided to the adhesion test.

—Evaluation Criteria—

A: The number of the remained squares was 25
B: The number of the remained square was 24 or less <Production of Coating Film by Inkjet System or Bar Coating>

Note that, the production of the coating film by an inkjet system was performed in the following manner.

The ink was sealed in an aluminium pouch in the shape illustrated in FIG. 1 so as not to include any bubble, and the pouch was housed in a plastic ink cartridge, such as the one illustrated in FIG. 2. In a housing, which was designed to house the aforementioned ink cartridge, an ink flow channel was provided from the ink cartridge to GEN 4 head manufactured by Ricoh Industry Company Ltd. A solid coating film was formed by ejecting the ink as inkjets using the aforementioned device. Note that, the deposited amount of the ink droplets was adjusted to give the similar average thickness to that of the coating film produced by the bar coating.

In the process of the bar coating, the average thickness of the coating film was adjusted by selecting a commercially available wire-wound bar.

Note that, the average thickness of the coating film in both the inkjet system and the bar coating means a thickness thereof in an undried state before UV radiation.

TABLE 3

|   |   | Material (parts by mass) | Comp. Ex. 1 | | | Ex. 1 | | |
|---|---|---|---|---|---|---|---|---|
| A |   | tert-butylmethacrylate | 85 | | | 85 | | |
| B |   | glycerol dimethacrylate | 15 | | | 15 | | |
| C |   | tricyclodecanedimethanol dimethacrylate | — | | | — | | |
| D | D1 | 1-hydroxy-cyclohexylphenylketone | — | | | — | | |
|   | D2 | 2-dimethylamino-2-(4-methylbenzyl)-1-(4-morpholin-4-yl)butan-1-one | 6 | | | 6 | | |
| E | E1 | polystyrene (Mw = 4,400, no acid value) | — | | | 20 | | |
|   | E2 | ethyl polymethacrylate (Mw = 300,000-450,000, no acid value) | — | | | — | | |
|   | E3 | styrene-butylmethacrylate copolymer (Mw = 200,000-300,000, no acid value) | — | | | — | | |
|   | E4 | styrene-acrylic acid-α-methylstyrene copolymer (acid value: 108 mgKOH/g) | 20 | | | — | | |
| Carbon black | | | — | | | — | | |
| Mass ratio (E/(B + C)) | | | 20/15 = 1.3 | | | 20/15 = 1.3 | | |
| UV radiation does (mJ/cm$^2$) | | | 1,000 | 2,000 | | 1,000 | 2,000 | |
| Average thickness of coating film before curing (μm) | | | 6 | 6 | 10 | 6 | 6 | 10 |
| Inkjet coating | Before immersing in water | Adhesion to polypropylene | 25 A | 25 A | 25 A | 25 A | 25 A | 25 A |
|   |   | Adhesion to polyethylene terephthalate | 25 A | 25 A | 25 A | 25 A | 25 A | 25 A |
|   | After immersing in water | Adhesion to polypropylene | 0 B | 0 B | 0 B | 25 A | 25 A | 25 A |
|   |   | Adhesion to polyethylene terephthalate | 0 B | 0 B | 0 B | 25 A | 25 A | 25 A |
| Bar coating | Before immersing in water | Adhesion to polypropylene | 25 A | 25 A | 25 A | 25 A | 25 A | 25 A |
|   |   | Adhesion to polyethylene terephthalate | 25 A | 25 A | 25 A | 25 A | 25 A | 25 A |
|   | After immersing in water | Adhesion to polypropylene | 0 B | 0 B | 0 B | 25 A | 25 A | 25 A |
|   |   | Adhesion to polyethylene terephthalate | 0 B | 0 B | 0 B | 25 A | 25 A | 25 A |

TABLE 4

|   |   | Material (parts by mass) | Comp. Ex. 2 | Ex. 2 |
|---|---|---|---|---|
| A |   | tert-butylmethacrylate | 85 | 85 |
| B |   | glycerol dimethacrylate | 15 | 15 |
| C |   | tricyclodecanedimethanol dimethacrylate | — | — |
| D | D1 | 1-hydroxy-cyclohexylphenylketone | — | — |
|   | D2 | 2-dimethylamino-2-(4-methylbenzyl)-1-(4-morpholin-4-yl)butan-1-one | 6 | 6 |
| E | E1 | polystyrene (Mw = 4,400, no acid value) | 12 | 12.1 |
|   | E2 | ethyl polymethacrylate (Mw = 300,000-450,000, no acid value) | — | — |
|   | E3 | styrene-butylmethacrylate copolymer (Mw = 200,000-300,000, no acid value) | — | — |

TABLE 4-continued

| | Material (parts by mass) | | Comp. Ex. 2 | Ex. 2 |
|---|---|---|---|---|
| | E4 | styrene-acrylic acid-α-methylstyrene copolymer (acid value: 108 mgKOH/g) | — | — |
| | | Carbon black | — | — |
| | | Mass ratio (E/(B + C)) | 0.80 | 0.81 |
| | | UV radiation does (mJ/cm²) | 2,000 | 2,000 |
| | | Average thickness of coating film before curing (μm) | 6 | 6 |
| Inkjet coating | Before immersing in water | Adhesion to polypropylene | 25 A | 25 A |
| | | Adhesion to polyethylene terephthalate | 25 A | 25 A |
| | After immersing in water | Adhesion to polypropylene | 23 B | 25 A |
| | | Adhesion to polyethylene terephthalate | 19 B | 25 A |
| Bar coating | Before immersing in water | Adhesion to polypropylene | 25 A | 25 A |
| | | Adhesion to polyethylene terephthalate | 25 A | 25 A |
| | After immersing in water | Adhesion to polypropylene | 20 B | 25 A |
| | | Adhesion to polyethylene terephthalate | 22 B | 25 A |

TABLE 5

| | | Material (parts by mass) | Ex. 3 | | | Ex. 4 | | |
|---|---|---|---|---|---|---|---|---|
| A | | tert-butylmethacrylate | 85 | | | 85 | | |
| B | | glycerol dimethacrylate | 15 | | | 5 | | |
| C | | tricyclodecanedimethanol dimethacrylate | — | | | 10 | | |
| D | D1 | 1-hydroxy-cyclohexylphenylketone | 10 | | | — | | |
| | D2 | 2-dimethylamino-2-(4-methylbenzyl)-1-(4-morpholin-4-yl)butan-1-one | — | | | 6 | | |
| E | E1 | polystyrene (Mw = 4,400, no acid value) | 20 | | | 20 | | |
| | E2 | ethyl polymethacrylate (Mw = 300,000-450,000, no acid value) | — | | | — | | |
| | E3 | styrene-butylmethacrylate copolymer (Mw = 200,000-300,000, no acid value) | — | | | — | | |
| | E4 | styrene-acrylic acid-α-methylstyrene copolymer (acid value: 108 mgKOH/g) | — | | | — | | |
| Carbon black | | | — | | | — | | |
| Mass ratio (E/(B + C)) | | | 20/15 = 1.3 | | | 20/15 = 1.3 | | |
| UV radiation does (mJ/cm²) | | | 1,000 | 2,000 | | 1,000 | 2,000 | |
| Average thickness of coating film before curing (μm) | | | 6 | 6 | 10 | 6 | 6 | 10 |
| Inkjet coating | Before immersing in water | Adhesion to polypropylene | 25 A | 25 A | 25 A | 25 A | 25 A | 25 A |
| | | Adhesion to polyethylene terephthalate | 25 A | 25 A | 25 A | 25 A | 25 A | 25 A |
| | After immersing in water | Adhesion to polypropylene | 25 A | 25 A | 25 A | 25 A | 25 A | 25 A |
| | | Adhesion to polyethylene terephthalate | 25 A | 25 A | 25 A | 25 A | 25 A | 25 A |
| Bar coating | Before immersing in water | Adhesion to polypropylene | 25 A | 25 A | 25 A | 25 A | 25 A | 25 A |
| | | Adhesion to polyethylene terephthalate | 25 A | 25 A | 25 A | 25 A | 25 A | 25 A |
| | After immersing in water | Adhesion to polypropylene | 25 A | 25 A | 25 A | 25 A | 25 A | 25 A |
| | | Adhesion to polyethylene terephthalate | 25 A | 25 A | 25 A | 25 A | 25 A | 25 A |

TABLE 6

| | | Material (parts by mass) | Ex. 5 | | | | | | Ex. 6 | | | |
|---|---|---|---|---|---|---|---|---|---|---|---|---|
| A | | tert-butylmethacrylate | 96 | | | | | | 96 | | | |
| B | | glycerol dimethacrylate | 4 | | | | | | 4 | | | |
| C | | tricyclodecanedimethanol dimethacrylate | — | | | | | | — | | | |
| D | D1 | 1-hydroxy-cyclohexylphenylketone | — | | | | | | — | | | |
| | D2 | 2-dimethylamino-2-(4-methylbenzyl)-1-(4-morpholin-4-yl)butan-1-one | 2 | | | | | | 2 | | | |
| E | E1 | polystyrene (Mw = 4,400, no acid value) | 12 | | | | | | — | | | |
| | E2 | ethyl polymethacrylate (Mw = 300,000-450,000, no acid value) | — | | | | | | 8 | | | |
| | E3 | styrene-butylmethacrylate copolymer (Mw = 200,000-300,000, no acid value) | — | | | | | | — | | | |
| | E4 | styrene-acrylic acid-α-methylstyrene copolymer (acid value: 108 mgKOH/g) | — | | | | | | — | | | |
| | E5 | ethyl polymethacrylate (Mw = 700,000-1,300,000, no acid value) | — | | | | | | — | | | |
| Carbon black | | | — | | | | | | — | | | |
| Mass ratio (E/(B + C)) | | | 12/4 = 3 | | | | | | 8/4 = 2 | | | |
| UV radiation does (mJ/cm$^2$) | | | 1,000 | | | 2,000 | | | 1,000 | | 2,000 | |
| Average thickness of coating film before curing (μm) | | | 6 | 10 | 20 | 6 | 10 | 20 | 6 | 10 | 6 | 10 |
| Inkjet coating | Before immersing in water | Adhesion to polypropylene | 25 A | 25 A | 25 A | 25 A | 25 A | 25 A | 25 A | 25 A | 25 A | 25 A |
| | | Adhesion to polyethylene terephthalate | 25 A | 25 A | 25 A | 25 A | 25 A | 25 A | 25 A | 25 A | 25 A | 25 A |
| | After immersing in water | Adhesion to polypropylene | 25 A | 25 A | 25 A | 25 A | 25 A | 25 A | 25 A | 25 A | 25 A | 25 A |
| | | Adhesion to polyethylene terephthalate | 25 A | 25 A | 25 A | 25 A | 25 A | 25 A | 25 A | 25 A | 25 A | 25 A |
| Bar coating | Before immersing in water | Adhesion to polypropylene | 25 A | 25 A | 25 A | 25 A | 25 A | 25 A | 25 A | 25 A | 25 A | 25 A |
| | | Adhesion to polyethylene terephthalate | 25 A | 25 A | 25 A | 25 A | 25 A | 25 A | 25 A | 25 A | 25 A | 25 A |
| | After immersing in water | Adhesion to polypropylene | 25 A | 25 A | 25 A | 25 A | 25 A | 25 A | 25 A | 25 A | 25 A | 25 A |
| | | Adhesion to polyethylene terephthalate | 25 A | 25 A | 25 A | 25 A | 25 A | 25 A | 25 A | 25 A | 25 A | 25 A |

TABLE 7

| | | Material (parts by mass) | Ex. 7 | | | | Ex. 8 | | |
|---|---|---|---|---|---|---|---|---|---|
| A | | tert-butylmethacrylate | 96 | | | | 85 | | |
| B | | glycerol dimethacrylate | 4 | | | | 15 | | |
| C | | tricyclodecanedimethanol dimethacrylate | — | | | | — | | |
| D | D1 | 1-hydroxy-cyclohexylphenylketone | — | | | | — | | |
| | D2 | 2-dimethylamino-2-(4-methylbenzyl)-1-(4-morpholin-4-yl)butan-1-one | 2 | | | | 6 | | |
| E | E1 | polystyrene (Mw = 4,400, no acid value) | — | | | | 20 | | |
| | E2 | ethyl polymethacrylate (Mw = 300,000-450,000, no acid value) | — | | | | — | | |
| | E3 | styrene-butylmethacrylate copolymer (Mw = 200,000-300,000, no acid value) | 8 | | | | — | | |
| | E4 | styrene-acrylic acid-α-methylstyrene copolymer (acid value: 108 mgKOH/g) | — | | | | — | | |
| | E5 | ethyl polymethacrylate (Mw = 700,000-1,300,000, no acid value) | — | | | | — | | |
| Carbon black | | | — | | | | 3 | | |
| Mass ratio (E/(B + C)) | | | 8/4 = 2 | | | | 20/15 = 1.3 | | |
| UV radiation does (mJ/cm$^2$) | | | 1,000 | | 2,000 | | 1,000 | 2,000 | |
| Average thickness of coating film before curing (μm) | | | 6 | 10 | 6 | 10 | 6 | 6 | 10 |

TABLE 7-continued

|  |  | Material (parts by mass) | Ex. 7 | | | | Ex. 8 | | |
| --- | --- | --- | --- | --- | --- | --- | --- | --- | --- |
| Inkjet coating | Before immersing in water | Adhesion to polypropylene | 25 A | 25 A | 25 A | 25 A | 25 A | 25 A | 25 A |
|  |  | Adhesion to polyethylene terephthalate | 25 A | 25 A | 25 A | 25 A | 25 A | 25 A | 25 A |
|  | After immersing in water | Adhesion to polypropylene | 25 A | 25 A | 25 A | 25 A | 25 A | 25 A | 25 A |
|  |  | Adhesion to polyethylene terephthalate | 25 A | 25 A | 25 A | 25 A | 25 A | 25 A | 25 A |
| Bar coating | Before immersing in water | Adhesion to polypropylene | 25 A | 25 A | 25 A | 25 A | 25 A | 25 A | 25 A |
|  |  | Adhesion to polyethylene terephthalate | 25 A | 25 A | 25 A | 25 A | 25 A | 25 A | 25 A |
|  | After immersing in water | Adhesion to polypropylene | 25 A | 25 A | 25 A | 25 A | 25 A | 25 A | 25 A |
|  |  | Adhesion to polyethylene terephthalate | 25 A | 25 A | 25 A | 25 A | 25 A | 25 A | 25 A |

TABLE 8

|  |  | Material (parts by mass) | Ex. 9 | Ex. 10 |
| --- | --- | --- | --- | --- |
| A |  | tert-butylmethacrylate | 96 | 96 |
| B |  | glycerol dimethacrylate | 4 | 4 |
| C |  | tricyclodecanedimethanol dimethacrylate | — | — |
| D | D1 | 1-hydroxy-cyclohexylphenylketone | — | — |
|  | D2 | 2-dimethylamino-2-(4-methylbenzyl)-1-(4-morpholin-4-yl)butan-1-one | 2 | 2 |
| E | E1 | polystyrene (Mw = 4,400, no acid value) | 8 | — |
|  | E2 | ethyl polymethacrylate (Mw = 300,000-450,000, no acid value) | 2 | — |
|  | E3 | styrene-butylmethacrylate copolymer (Mw = 200,000-300,000, no acid value) | 2 | — |
|  | E4 | styrene-acrylic acid-α-methylstyrene copolymer (acid value: 108 mgKOH/g) | — | — |
|  | E5 | ethyl polymethacrylate (Mw = 700,000-1,300,000, no acid value) | — | 8 |
| Carbon black |  |  | — | — |
| Mass ratio (E/(B + C)) |  |  | 12/4 = 3 | 8/4 = 2 |
| UV radiation does (mJ/cm$^2$) |  |  | 1,000  2,000 | 1,000  2,000 |
| Average thickness of coating film before curing (μm) |  |  | 6  10  6  10  20 | 6  10  6  10 |
| Inkjet coating | Before immersing | Adhesion to polypropylene | 25 A  25 A  25 A  25 A  25 A | 25 A  25 A  25 A  25 A |
|  |  | Adhesion to polyethylene terephthalate | 25 A  25 A  25 A  25 A  25 A | 25 A  25 A  25 A  25 A |
|  | After immersing | Adhesion to polypropylene | 25 A  25 A  25 A  25 A  25 A | 25 A  25 A  25 A  25 A |
|  |  | Adhesion to polyethylene terephthalate | 25 A  25 A  25 A  25 A  25 A | 25 A  25 A  25 A  25 A |
| Bar coating | Before immersing | Adhesion to polypropylene | 25 A  25 A  25 A  25 A  25 A | 25 A  25 A  25 A  25 A |
|  |  | Adhesion to polyethylene terephthalate | 25 A  25 A  25 A  25 A  25 A | 25 A  25 A  25 A  25 A |
|  | After immersing | Adhesion to polypropylene | 25 A  25 A  25 A  25 A  25 A | 25 A  25 A  25 A  25 A |
|  |  | Adhesion to polyethylene terephthalate | 25 A  25 A  25 A  25 A  25 A | 25 A  25 A  25 A  25 A |

<Pencil Hardness Test>

The pencil hardness test performed on Examples 1 and 4 as a coating film strength evaluation was carried out using a polyethylene terephthalate film (A4300, manufactured by TOYOBO CO., LTD., thickness: 188 µm) as a base material, and measured 1 day after the formation of a cured coating film in accordance with JIS K5600-5-4 scratch hardness (pencil method), for the purpose of securing the accuracy of the evaluation regardless of insufficient adhesion.

As for the pencil, a wood pencil set for drawing (manufactured by Mitsubishi Pencil Co., Ltd.) of the following hardness was used.

6B, 5B, 4B, 3B, 2B, B, HB, F, H, 2H, 3H, 4H, 5H, 6H

TABLE 9

|  | Pencil hardness |
|---|---|
| Example 1 | HB |
| Example 4 | F |

It was conformed from the results of Tables 3 to 9 that, as seen from the comparison between Comparative Example 1 and Example 1, the adhesion was deteriorated after immersed in the warm water, when the polymer component contained hydrophilic functional groups, and in the case of the polymer component free from a hydrophilic functional group, the adhesion could be maintained even after immersed in warm water, by appropriately setting the conditions for producing the coating film, e.g., the UV radiation dose, and the average thickness of the coating film before curing, and the water resistance of the coating film could be improved.

Moreover, it was confirmed from the comparison between Comparative Example 2 and Example 2, and the comparison between Examples 1, 2, and 5 that, as long as the mass ratio (A/B) of the amount (A) of the polymer free from a hydrophilic functional group to the amount (B) of the polyfunctional monomer(s) was greater than 0.80 but 3 or less, the adhesion could be maintained even after immersed in warm water, by appropriately setting the conditions for producing the coating film, e.g., the UV radiation dose, and the average thickness of the coating film before curing, and the water resistance of the coating film could be improved. In addition, it was confirmed that the water resistance of the coating film produced under the wider production conditions can be improved, as the mass ratio (A/B) was greater. Especially, in Example 5, it was confirmed that the water resistance of the coating film could be improved, the wide range of the conditions, such that the average thickness of the coating film before curing was 6 µm to 20 µm, and the wide range of the conditions, such that the radiation dose of UV rays was 1,000 mJ/cm$^2$ to 2,000 mJ/cm$^2$. Although it was not depicted in the tables, a coating film having a thickness of 20 µm before curing was formed by spray coating in Example 5, and the similar results were obtained.

As it could be seen from the comparison between Example 1 and Example 3, moreover, it was confirmed that the water resistance of the coating film could be similarly improved, even though a type of the photopolymerizable initiator for use was different.

As it could be seen from the comparison between Example 1 and Example 4, it was confirmed that the water resistance of the coating film was similarly improved even when tricyclodecane dimethanol dimethacrylate was further added as a polyfunctional monomer, in addition to glycerol dimethacrylate. The strength of the coating film was pencil hardness HB in Example 1, but the strength of the coating film was pencil hardness F in Example 4. It was confirmed that the coating film strength was improved when tricyclodecane dimethanol dimethacrylate was further added.

As it was seen from the comparison between Examples 5, 6, and 7, moreover, it was confirmed that the water resistance of the coating film could be similarly improved with various types of polymers, as long as they were polymers free from a hydrophilic functional group. Moreover, it was confirmed that the water resistance of the coating film could be similarly improved even when various types of polymers were used in combination, as in Example 9. When the polymer having a large weight average molecular weight was used, as in Example 10, excellent results were obtained, but it was necessary to heat to dissolve, whereas excellent solubility was obtained at room temperature in all the other examples. Therefore, the weight average molecular weight of the polymer component for use is preferably not excessively large, in view of energy saving and simplicity of the process. A type of a polymer for use, or combination of polymers are appropriately selected under the consideration of solubility at the time of the production of the photopolymerizable composition, and other various properties required for the coating film.

Although they were not depicted in the tables, it was confirmed that the water resistance of the coating film was similarly improved in each of these Examples, even when polycarbonate ("Panlite 1151N" manufactured by TEIJIN LIMITED), ABS ("ABS-1100-N1-G" manufactured by Sekisui Seikei, Ltd.), polyvinyl chloride ("HP-319" manufactured by Sekisui Seikei, Ltd.), polystyrene ("PS-2000-W1-G" manufactured by Sekisui Seikei, Ltd.), an acryl plate ("SUMIPEX AS" manufactured by SUMIKA ACRYL CO., LTD.), glass (general slide glass for physical and chemical experiments), aluminium (general aluminium plate), or stainless steel (general stainless steel plate) was used as the base material other than the polypropylene and polyethylene terephthalate.

As seen from Example 8, it was confirmed that the water resistance of the coating film could be improved even when the carbon black was contained as a colorant. Although they were not depicted in the table, the same results were obtained when each of a yellow pigment "Toner Yellow HG" manufactured by Clariant Japan K.K., a magenta pigment "CINQUASIA MAGENTA L 4540" manufactured by BASF, and a cyan pigment "Lionogen Blue LX-8091" manufactured by TOKYOCOLOR CO., LTD. was blended instead of the carbon black, in the same conditions as those for the carbon black.

Note that, it was confirmed in all Examples that the coating film after light irradiation was desirably cured without tackiness, as it was touched with fingers.

Examples 11 to 20 and Comparative Examples 3 to 4

Photopolymerizable compositions were each prepared by blending the materials in the amounts (the values were based on parts by mass) depicted in each column of respective Examples and Comparative Examples in the following tables 10 to 15.

The components depicted in the following tables 10 to 15 are as follows.

(A) component: n-pentyl methacrylate (trade name: "n-AmylMethacrylate" manufactured by Toyo Science Corp. (negative), evaluated with the literature (test method: maximization method, viscosity at 25° C.: 1 mPa·s)

(B) to (E) components: the same as above

Carbon black: the same as above

TABLE 10

| | | Material (parts by mass) | Comp. Ex. 3 | | | Ex. 11 | | |
|---|---|---|---|---|---|---|---|---|
| A | | n-pentyl methacrylate | 85 | | | 85 | | |
| B | | glycerol dimethacrylate | 15 | | | 15 | | |
| C | | tricyclodecanedimethanol dimethacrylate | — | | | — | | |
| D | D1 | 1-hydroxy-cyclohexylphenylketone | — | | | — | | |
| | D2 | 2-dimethylamino-2-(4-methylbenzyl)-1-(4-morpholin-4-yl)butan-1-one | 6 | | | 6 | | |
| E | E1 | polystyrene (Mw = 4,400, no acid value) | — | | | 20 | | |
| | E2 | ethyl polymethacrylate (Mw = 300,000-450,000, no acid value) | — | | | — | | |
| | E3 | styrene-butylmethacrylate copolymer (Mw = 200,000-300,000, no acid value) | — | | | — | | |
| | E4 | styrene-acrylic acid-α-methylstyrene copolymer (acid value: 108 mgKOH/g) | 20 | | | — | | |
| Carbon black | | | — | | | — | | |
| Mass ratio (E/(B + C)) | | | 20/15 = 1.3 | | | 20/15 = 1.3 | | |
| UV radiation does (mJ/cm$^2$) | | | 1,000 | 2,000 | | 1,000 | 2,000 | |
| Average thickness of coating film before curing (μm) | | | 6 | 6 | 10 | 6 | 6 | 10 |
| Inkjet coating | Before immersing in water | Adhesion to polypropylene | 25 A | 25 A | 25 A | 25 A | 25 A | 25 A |
| | | Adhesion to polyethylene terephthalate | 25 A | 25 A | 25 A | 25 A | 25 A | 25 A |
| | After immersing in water | Adhesion to polypropylene | 0 B | 0 B | 0 B | 25 A | 25 A | 25 A |
| | | Adhesion to polyethylene terephthalate | 0 B | 0 B | 0 B | 25 A | 25 A | 25 A |
| Bar coating | Before immersing in water | Adhesion to polypropylene | 25 A | 25 A | 25 A | 25 A | 25 A | 25 A |
| | | Adhesion to polyethylene terephthalate | 25 A | 25 A | 25 A | 25 A | 25 A | 25 A |
| | After immersing in water | Adhesion to polypropylene | 0 B | 0 B | 0 B | 25 A | 25 A | 25 A |
| | | Adhesion to polyethylene terephthalate | 0 B | 0 B | 0 B | 25 A | 25 A | 25 A |

TABLE 11

| | | Material (parts by mass) | Comp. Ex. 4 | Ex. 12 |
|---|---|---|---|---|
| A | | n-pentyl methacrylate | 85 | 85 |
| B | | glycerol dimethacrylate | 15 | 15 |
| C | | tricyclodecanedimethanol dimethacrylate | — | — |
| D | D1 | 1-hydroxy-cyclohexylphenylketone | — | — |
| | D2 | 2-dimethylamino-2-(4-methylbenzyl)-1-(4-morpholin-4-yl)butan-1-one | 6 | 6 |
| E | E1 | polystyrene (Mw = 4,400, no acid value) | 12 | 12.1 |
| | E2 | ethyl polymethacrylate (Mw = 300,000-450,000, no acid value) | — | — |
| | E3 | styrene-butylmethacrylate copolymer (Mw = 200,000-300,000, no acid value) | — | — |
| | E4 | styrene-acrylic acid-α-methylstyrene copolymer (acid value: 108 mgKOH/g) | 20 | — |
| | | Carbon black | — | — |
| | | Mass ratio (E/(B + C)) | 0.8 | 0.81 |
| | | UV radiation does (mJ/cm$^2$) | 2,000 | 2,000 |
| | | Average thickness of coating film before curing (μm) | 6 | 6 |
| Inkjet coating | Before immersing in water | Adhesion to polypropylene | 25 A | 25 A |
| | | Adhesion to polyethylene terephthalate | 25 A | 25 A |
| | After immersing in water | Adhesion to polypropylene | 23 B | 25 A |
| | | Adhesion to polyethylene terephthalate | 19 B | 25 A |

TABLE 11-continued

| | | Material (parts by mass) | Comp. Ex. 4 | Ex. 12 |
|---|---|---|---|---|
| Bar coating | Before immersing in water | Adhesion to polypropylene | 25 A | 25 A |
| | | Adhesion to polyethylene terephthalate | 25 A | 25 A |
| | After immersing in water | Adhesion to polypropylene | 20 B | 25 A |
| | | Adhesion to polyethylene terephthalate | 22 B | 25 A |

TABLE 12

| | | Material (parts by mass) | Ex. 13 | | | Ex. 14 | | |
|---|---|---|---|---|---|---|---|---|
| A | | n-pentyl methacrylate | 85 | | | 85 | | |
| B | | glycerol dimethacrylate | 15 | | | 15 | | |
| C | | tricyclodecanedimethanol dimethacrylate | — | | | 10 | | |
| D | D1 | 1-hydroxy-cyclohexylphenylketone | 10 | | | — | | |
| | D2 | 2-dimethylamino-2-(4-methylbenzyl)-1-(4-morpholin-4-yl)butan-1-one | — | | | 6 | | |
| E | E1 | polystyrene (Mw = 4,400, no acid value) | 20 | | | 20 | | |
| | E2 | ethyl polymethacrylate (Mw = 300,000-450,000, no acid value) | — | | | — | | |
| | E3 | styrene-butylmethacrylate copolymer (Mw = 200,000-300,000, no acid value) | — | | | — | | |
| | E4 | styrene-acrylic acid-α-methylstyrene copolymer (acid value: 108 mgKOH/g) | — | | | — | | |
| Carbon black | | | — | | | — | | |
| Mass ratio (E/(B + C)) | | | 20/15 = 1.3 | | | 20/15 = 1.3 | | |
| UV radiation does (mJ/cm$^2$) | | | 1,000 | 2,000 | | 1,000 | 2,000 | |
| Average thickness of coating film before curing (μm) | | | 6 | 6 | 10 | 6 | 6 | 10 |
| Inkjet coating | Before immersing in water | Adhesion to polypropylene | 25 A | 25 A | 25 A | 25 A | 25 A | 25 A |
| | | Adhesion to polyethylene terephthalate | 25 A | 25 A | 25 A | 25 A | 25 A | 25 A |
| | After immersing in water | Adhesion to polypropylene | 25 A | 25 A | 25 A | 25 A | 25 A | 25 A |
| | | Adhesion to polyethylene terephthalate | 25 A | 25 A | 25 A | 25 A | 25 A | 25 A |
| Bar coating | Before immersing in water | Adhesion to polypropylene | 25 A | 25 A | 25 A | 25 A | 25 A | 25 A |
| | | Adhesion to polyethylene terephthalate | 25 A | 25 A | 25 A | 25 A | 25 A | 25 A |
| | After immersing in water | Adhesion to polypropylene | 25 A | 25 A | 25 A | 25 A | 25 A | 25 A |
| | | Adhesion to polyethylene terephthalate | 25 A | 25 A | 25 A | 25 A | 25 A | 25 A |

TABLE 13

| | | Material (parts by mass) | Ex. 15 | Ex. 16 |
|---|---|---|---|---|
| A | | n-pentyl methacrylate | 96 | 96 |
| B | | glycerol dimethacrylate | 4 | 4 |
| C | | tricyclodecanedimethanol dimethacrylate | — | — |
| D | D1 | 1-hydroxy-cyclohexylphenylketone | — | — |
| | D2 | 2-dimethylamino-2-(4-methylbenzyl)-1-(4-morpholin-4-yl)butan-1-one | 2 | 2 |
| E | E1 | polystyrene (Mw = 4,400, no acid value) | 12 | — |
| | E2 | ethyl polymethacrylate (Mw = 300,000-450,000, no acid value) | — | 8 |

TABLE 13-continued

| | Material (parts by mass) | Ex. 15 | | | | | | Ex. 16 | | | |
|---|---|---|---|---|---|---|---|---|---|---|---|
| E3 | styrene-butylmethacrylate copolymer (Mw = 200,000-300,000, no acid value) | — | | | | | | — | | | |
| E4 | styrene-acrylic acid-α-methylstyrene copolymer (acid value: 108 mgKOH/g) | — | | | | | | — | | | |
| E5 | ethyl polymethacrylate (Mw = 700,000-1,300,000, no acid value) | — | | | | | | — | | | |
| Carbon black | | — | | | | | | — | | | |
| Mass ratio (E/(B + C)) | | 12/4 = 3 | | | | | | 8/4 = 2 | | | |
| UV radiation does (mJ/cm$^2$) | | 1,000 | | | 2,000 | | | 1,000 | | 2,000 | |
| Average thickness of coating film before curing (μm) | | 6 | 10 | 20 | 6 | 10 | 20 | 6 | 10 | 6 | 10 |
| Inkjet coating | Before immersing in water | Adhesion to polypropylene | 25 A | 25 A | 25 A | 25 A | 25 A | 25 A | 25 A | 25 A | 25 A | 25 A |
| | | Adhesion to polyethylene terephthalate | 25 A | 25 A | 25 A | 25 A | 25 A | 25 A | 25 A | 25 A | 25 A | 25 A |
| | After immersing in water | Adhesion to polypropylene | 25 A | 25 A | 25 A | 25 A | 25 A | 25 A | 25 A | 25 A | 25 A | 25 A |
| | | Adhesion to polyethylene terephthalate | 25 A | 25 A | 25 A | 25 A | 25 A | 25 A | 25 A | 25 A | 25 A | 25 A |
| Bar coating | Before immersing in water | Adhesion to polypropylene | 25 A | 25 A | 25 A | 25 A | 25 A | 25 A | 25 A | 25 A | 25 A | 25 A |
| | | Adhesion to polyethylene terephthalate | 25 A | 25 A | 25 A | 25 A | 25 A | 25 A | 25 A | 25 A | 25 A | 25 A |
| | After immersing in water | Adhesion to polypropylene | 25 A | 25 A | 25 A | 25 A | 25 A | 25 A | 25 A | 25 A | 25 A | 25 A |
| | | Adhesion to polyethylene terephthalate | 25 A | 25 A | 25 A | 25 A | 25 A | 25 A | 25 A | 25 A | 25 A | 25 A |

TABLE 14

| | | Material (parts by mass) | Ex. 17 | | | | Ex. 18 | | |
|---|---|---|---|---|---|---|---|---|---|
| A | | n-pentyl methacrylate | 96 | | | | 85 | | |
| B | | glycerol dimethacrylate | 4 | | | | 15 | | |
| C | | tricyclodecanedimethanol dimethacrylate | — | | | | — | | |
| D | D1 | 1-hydroxy-cyclohexylphenylketone | — | | | | — | | |
| | D2 | 2-dimethylamino-2-(4-methylbenzyl)-1-(4-morpholin-4-yl)butan-1-one | 2 | | | | 6 | | |
| E | E1 | polystyrene (Mw = 4,400, no acid value) | — | | | | 20 | | |
| | E2 | ethyl polymethacrylate (Mw = 300,000-450,000, no acid value) | — | | | | — | | |
| | E3 | styrene-butylmethacrylate copolymer (Mw = 200,000-300,000, no acid value) | 8 | | | | — | | |
| | E4 | styrene-acrylic acid-α-methylstyrene copolymer (acid value: 108 mgKOH/g) | — | | | | — | | |
| | E5 | ethyl polymethacrylate (Mw = 700,000-1,300,000, no acid value) | — | | | | — | | |
| Carbon black | | | — | | | | 3 | | |
| Mass ratio (E/(B + C)) | | | 8/4 = 2 | | | | 20/15 = 1.3 | | |
| UV radiation does (mJ/cm$^2$) | | | 1,000 | | 2,000 | | 1,000 | 2,000 | |
| Average thickness of coating film before curing (μm) | | | 6 | 10 | 6 | 10 | 6 | 6 | 10 |
| Inkjet coating | Before immersing in water | Adhesion to polypropylene | 25 A | 25 A | 25 A | 25 A | 25 A | 25 A | 25 A |
| | | Adhesion to polyethylene terephthalate | 25 A | 25 A | 25 A | 25 A | 25 A | 25 A | 25 A |
| | After immersing in water | Adhesion to polypropylene | 25 A | 25 A | 25 A | 25 A | 25 A | 25 A | 25 A |
| | | Adhesion to polyethylene terephthalate | 25 A | 25 A | 25 A | 25 A | 25 A | 25 A | 25 A |
| Bar coating | Before immersing in water | Adhesion to polypropylene | 25 A | 25 A | 25 A | 25 A | 25 A | 25 A | 25 A |
| | in water | Adhesion to polyethylene terephthalate | 25 A | 25 A | 25 A | 25 A | 25 A | 25 A | 25 A |

TABLE 14-continued

| Material (parts by mass) | Ex. 17 | Ex. 18 |
|---|---|---|
| After immersing in water — Adhesion to polypropylene | 25 25 25 25 A A A A | 25 25 25 A A A |
| Adhesion to polyethylene terephthalate | 25 25 25 25 A A A A | 25 25 25 A A A |

TABLE 15

| | | Material (parts by mass) | Ex. 19 | Ex. 20 |
|---|---|---|---|---|
| A | | n-pentyl methacrylate | 96 | 96 |
| B | | glycerol dimethacrylate | 4 | 4 |
| C | | tricyclodecanedimethanol dimethacrylate | — | — |
| D | D1 | 1-hydroxy-cyclohexylphenylketone | — | — |
| | D2 | 2-dimethylamino-2-(4-methylbenzyl)-1-(4-morpholin-4-yl)butan-1-one | 2 | 2 |
| E | E1 | polystyrene (Mw = 4,400, no acid value) | 8 | — |
| | E2 | ethyl polymethacrylate (Mw = 300,000-450,000, no acid value) | 2 | — |
| | E3 | styrene-butylmethacrylate copolymer (Mw = 200,000-300,000, no acid value) | 2 | — |
| | E4 | styrene-acrylic acid-α-methylstyrene copolymer (acid value: 108 mgKOH/g) | — | — |
| | E5 | ethyl polymethacrylate (Mw = 700,000-1,300,000, no acid value) | — | 8 |
| Carbon black | | | — | — |
| Mass ratio (E/(B + C)) | | | 12/4 = 3 | 8/4 = 2 |
| UV radiation does (mJ/cm$^2$) | | | 1,000    2,000 | 1,000    2,000 |
| Average thickness of coating film before curing (μm) | | | 6   10   6   10 | 20   6   10   6   10 |
| Inkjet coating | Before immersing in water | Adhesion to polypropylene | 25 25 25 25 A A A A | 25 25 25 25 25 A A A A A |
| | | Adhesion to polyethylene terephthalate | 25 25 25 25 A A A A | 25 25 25 25 25 A A A A A |
| | After immersing in water | Adhesion to polypropylene | 25 25 25 25 A A A A | 25 25 25 25 25 A A A A A |
| | | Adhesion to polyethylene terephthalate | 25 25 25 25 A A A A | 25 25 25 25 25 A A A A A |
| Bar coating | Before immersing in water | Adhesion to polypropylene | 25 25 25 25 A A A A | 25 25 25 25 25 A A A A A |
| | | Adhesion to polyethylene terephthalate | 25 25 25 25 A A A A | 25 25 25 25 25 A A A A A |
| | After immersing in water | Adhesion to polypropylene | 25 25 25 25 A A A A | 25 25 25 25 25 A A A A A |
| | | Adhesion to polyethylene terephthalate | 25 25 25 25 A A A A | 25 25 25 25 25 A A A A A |

The embodiments of the present invention are, for example, as follows:

<1> A photopolymerizable composition, containing:
a monofunctional monomer having a viscosity of 5 mPa·s or less at 25° C.;
one or more polyfunctional monomers including glycerol dimethacrylate; and
a polymer free from a hydrophilic functional group,
wherein a mass ratio (A/B) of an amount (A) of the polymer free from a hydrophilic functional group to an amount (B) of the polyfunctional monomers is greater than 0.80 but 3 or less.

<2> The photopolymerizable composition according to <1>, wherein the mass ratio (A/B) is 1.3 to 2.

<3> The photopolymerizable composition according to <1> or <2>, wherein the polyfunctional monomers further contain tricyclodecane dimethanol dimethacrylate.

<4> The photopolymerizable composition according to any one of <1> to <3>, wherein the polymer free from a hydrophilic functional group has a weight average molecular weight of 4,400 to 450,000.

<5> The photopolymerizable composition according to any one of <1> to <4>, wherein the polymer free from a hydrophilic functional group has an acid value of 1 mgKOH/g or less.

<6> The photopolymerizable composition according to any one of <1> to <5>, further containing a colorant.

<7> The photopolymerizable composition according to any one of <1> to <6>, wherein an amount of the monofunctional monomer having a viscosity of 5 mPa·s or less at 25° C., is 5 parts by mass to 30 parts by mass relative to 1 part by mass of an amount of the glycerol dimethacrylate.

<8> A photopolymerizable ink, containing:
the photopolymerizable composition according to any one of <1> to <7>.

<9> The photopolymerizable ink according to <8>, wherein the photopolymerizable ink is for use in inkjet printing.

<10> A composition container, containing:
a container; and
the photopolymerizable inkjet composition according any one of <1> to <7>, housed in the container.

<11> A method for forming an image or a cured product, containing:
applying the photopolymerizable composition according to any one of <1> to <7>, or the photopolymerizable ink according to <8> or <9>; and
irradiating the photopolymerizable composition, or the photopolymerizable ink applied on the base material with active energy rays to cure the photopolymerizable composition, or the photopolymerizable ink <12> The method according to <11>, wherein the image or cured product before the curing has an average thickness of 5 μm to 20 μm.

<13> The method according to <11> or <12>, wherein the irradiating is irradiating the photopolymerizable composition, or the photopolymerizable ink applied on the base material with active energy rays a radiation dose of which is 1,000 mJ/cm$^2$ to 2,000 mJ/cm$^2$ to cure the photopolymerizable composition, or the photopolymerizable ink <14> The method according to any one of <11> to <13>, wherein the base material is paper, plastic, metal, ceramic, glass, a composite material of any of the foregoing materials, or any combination of the foregoing materials.

<15> An image or cured product forming device, containing:
an application unit configured to apply the photopolymerizable composition according to any one of <1> to <7>, or the photopolymerizable ink according to <8> or <9> onto a base material; and
a curing unit configured to irradiate the photopolymerizable composition, or the photopolymerizable ink applied onto the base material with active energy rays to cure the photopolymerizable composition, or the photopolymerizable ink <16> The image or cured product forming device according to <15>, wherein an image before the curing or a cured product composed of the photopolymerizable composition, the photopolymerizable ink, or the photopolymerizable inkjet ink has an average thickness of 5 μm to 20 μm.

<17> An image or a cured product, which is obtained by a method containing:
applying the photopolymerizable composition according to any one of <1> to <7>, or the photopolymerizable ink according to <8> or <9> onto a base material; and
curing the photopolymerizable composition, or the photopolymerizable ink

REFERENCE SIGNS LIST

200: ink cartridge
241: ink bag
242: ink inlet
243: ink outlet
244: cartridge case

The invention claimed is:

1. A photopolymerizable composition, comprising:
a monofunctional monomer having a viscosity of 5 mPa·s or less at 25° C. selected from the group consisting of t-butyl methacrylate, n-pentyl methacrylate, n-hexyl-methacrylate and mixtures thereof;
one or more polyfunctional monomers comprising glycerol dimethacrylate; and
a polymer free from a hydrophilic functional group having a molecular weight of from 200,000 to 450,000,
wherein a mass ratio (A/B) of an amount (A) of the polymer free from a hydrophilic functional group to an amount (B) of the polyfunctional monomers is greater than 0.80 but 3 or less.

2. The photopolymerizable composition according to claim 1, wherein the mass ratio (A/B) is 1.3 to 2.

3. The photopolymerizable composition according to claim 1, wherein the polyfunctional monomers further comprise tricyclodecane dimethanol dimethacrylate.

4. The photopolymerizable composition according to claim 1, wherein the polymer free from a hydrophilic functional group has an acid value of 1 mgKOH/g or less.

5. The photopolymerizable composition according to claim 1, further comprising a colorant.

6. The photopolymerizable composition according to claim 1, wherein an amount of the monofunctional monomer having a viscosity of 5 mPa·s or less at 25° C. is 5 parts by mass to 30 parts by mass relative to 1 part by mass of an amount of the glycerol dimethacrylate.

7. A photopolymerizable ink, comprising:
the photopolymerizable composition according to claim 1.

8. The photopolymerizable ink according to claim 7, wherein the photopolymerizable ink is suitable for inkjet printing.

9. A method for forming an image or a cured product, comprising:
applying the photopolymerizable ink according to claim 7 onto a base material; and
irradiating the photopolymerizable ink applied on the base material with active energy rays to cure the photopolymerizable ink.

10. The method according to claim 9, wherein the image or cured product before the curing has an average thickness of 5 μm to 20 μm.

11. The method according to claim 9, wherein the irradiating is irradiating the photopolymerizable ink applied on the base material with active energy rays a radiation dose of which is 1,000 mJ/cm$^2$ to 2,000 mJ/cm$^2$ to cure the photopolymerizable ink.

12. The method according to claim 9, wherein the base material is paper, plastic, metal, ceramic, glass, a composite material of any of the foregoing materials, or any combination of the foregoing materials.

13. An image or cured product forming device, comprising:
an application unit configured to apply the photopolymerizable ink according to claim 7 onto a base material; and
a curing unit configured to irradiate the photopolymerizable ink applied onto the base material with active energy rays to cure the photopolymerizable ink.

14. The image or cured product forming device according to claim 13, wherein an image before the curing or a cured product composed of the photopolymerizable composition or the photopolymerizable ink has an average thickness of 5 μm to 20 μm.

15. An image or a cured product, which is obtained by a method comprising:
applying the photopolymerizable ink according to claim 7 onto a base material; and
curing the photopolymerizable ink.

16. The photopolymerizable composition according to claim 1, wherein the photopolymerizable composition does not comprise a solvent.

17. The photopolymerizable composition according to claim 1, further comprising a pigment.

* * * * *